US009746812B2

(12) United States Patent
Kosaka

(10) Patent No.: US 9,746,812 B2
(45) Date of Patent: Aug. 29, 2017

(54) POWER SUPPLY UNIT AND IMAGE FORMING APPARATUS

(71) Applicant: Oki Data Corporation, Tokyo (JP)

(72) Inventor: Toru Kosaka, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 22 days.

(21) Appl. No.: 15/073,306

(22) Filed: Mar. 17, 2016

(65) Prior Publication Data
US 2016/0378051 A1 Dec. 29, 2016

(30) Foreign Application Priority Data

Jun. 23, 2015 (JP) .................................. 2015-125667

(51) Int. Cl.
G03G 15/00 (2006.01)
G03G 15/20 (2006.01)
H02M 1/42 (2007.01)
H02M 7/06 (2006.01)

(52) U.S. Cl.
CPC ......... *G03G 15/80* (2013.01); *G03G 15/2039* (2013.01); *H02M 1/4208* (2013.01); *H02M 7/06* (2013.01)

(58) Field of Classification Search
CPC .. H02M 1/4208; H02M 7/04; G03G 15/0266; G03G 15/80; G03G 15/2039; G03G 15/5004; G03G 15/205; G03G 15/2078
See application file for complete search history.

(56) References Cited

U.S. PATENT DOCUMENTS

| 2005/0082276 | A1* | 4/2005 | Hirst | G03G 15/2039 |
| | | | | 219/492 |
| 2011/0222896 | A1* | 9/2011 | Tamaoki | G06F 13/4291 |
| | | | | 399/88 |
| 2011/0318039 | A1* | 12/2011 | Watanabe | G03G 15/5004 |
| | | | | 399/69 |
| 2012/0224878 | A1 | 9/2012 | Ikebuchi et al. | |
| 2013/0136467 | A1* | 5/2013 | Naganawa | G03G 15/2039 |
| | | | | 399/37 |

(Continued)

FOREIGN PATENT DOCUMENTS

| EP | 2498137 A2 | 9/2012 |
| JP | 2013-235107 A | 11/2013 |

*Primary Examiner* — Walter L Lindsay, Jr.
*Assistant Examiner* — Jessica L Eley
(74) *Attorney, Agent, or Firm* — Rabin & Berdo, P.C.

(57) ABSTRACT

Provided is a power supply unit that includes a power factor correction circuit, a synchronizing signal generator, an alternating-current signal generator. The power factor correction circuit is configured to generate, based on a first alternating-current signal, a direct-current signal. The synchronizing signal generator is configured to generate, based on the first alternating-current signal, a synchronizing signal that is in synchronization with the first alternating-current signal. The alternating-current signal generator includes a switching section, and is configured to generate, based on the direct-current signal, a second alternating-current signal. The switching section is configured to perform, based on the synchronizing signal, a switching operation. The second alternating-current signal has a variable effective voltage value.

18 Claims, 20 Drawing Sheets

(56) References Cited

U.S. PATENT DOCUMENTS

2013/0330094 A1\* 12/2013 Tanaka ............... G03G 15/0283
399/44
2014/0079425 A1 3/2014 Tanaka et al.

\* cited by examiner

| SWITCHING CYCLE | SWITCHING DUTY RATIO |
|---|---|
| 0 | 0.000 |
| 1 | 0.174 |
| 2 | 0.342 |
| 3 | 0.500 |
| 4 | 0.643 |
| 5 | 0.766 |
| 6 | 0.866 |
| 7 | 0.940 |
| 8 | 0.985 |
| 9 | 1.000 |
| 10 | 0.985 |
| 11 | 0.940 |
| 12 | 0.866 |
| 13 | 0.766 |
| 14 | 0.643 |
| 15 | 0.500 |
| 16 | 0.342 |
| 17 | 0.174 |
| 18 | 1.000 |
| 19 | 0.826 |
| 20 | 0.658 |
| 21 | 0.500 |
| 22 | 0.357 |
| 23 | 0.234 |
| 24 | 0.134 |
| 25 | 0.060 |
| 26 | 0.015 |
| 27 | 0.000 |
| 28 | 0.015 |
| 29 | 0.060 |
| 30 | 0.134 |
| 31 | 0.234 |
| 32 | 0.357 |
| 33 | 0.500 |
| 34 | 0.658 |
| 35 | 0.826 |

FIG. 11

| SWITCHING CYCLE | SWITCHING DUTY RATIO | | | |
|---|---|---|---|---|
| | 100Vrms (141Vp) | 71Vrms (100Vp) | 50Vrms (70.5Vp) | 25Vrms (35.25Vp) |
| 0 | 0.000 | 0.000 | 0.000 | 0.000 |
| 1 | 0.063 | 0.045 | 0.031 | 0.016 |
| 2 | 0.124 | 0.088 | 0.062 | 0.031 |
| 3 | 0.181 | 0.128 | 0.090 | 0.045 |
| 4 | 0.232 | 0.165 | 0.116 | 0.058 |
| 5 | 0.277 | 0.196 | 0.138 | 0.069 |
| 6 | 0.313 | 0.222 | 0.157 | 0.078 |
| 7 | 0.340 | 0.241 | 0.170 | 0.085 |
| 8 | 0.356 | 0.253 | 0.178 | 0.089 |
| 9 | 0.362 | 0.256 | 0.181 | 0.090 |
| 10 | 0.356 | 0.253 | 0.178 | 0.089 |
| 11 | 0.340 | 0.241 | 0.170 | 0.085 |
| 12 | 0.313 | 0.222 | 0.157 | 0.078 |
| 13 | 0.277 | 0.196 | 0.138 | 0.069 |
| 14 | 0.232 | 0.165 | 0.116 | 0.058 |
| 15 | 0.181 | 0.128 | 0.090 | 0.045 |
| 16 | 0.124 | 0.088 | 0.062 | 0.031 |
| 17 | 0.063 | 0.045 | 0.031 | 0.016 |
| 18 | 1.000 | 1.000 | 1.000 | 1.000 |
| 19 | 0.937 | 0.955 | 0.969 | 0.984 |
| 20 | 0.876 | 0.912 | 0.938 | 0.969 |
| 21 | 0.819 | 0.872 | 0.910 | 0.955 |
| 22 | 0.768 | 0.835 | 0.884 | 0.942 |
| 23 | 0.723 | 0.804 | 0.862 | 0.931 |
| 24 | 0.687 | 0.778 | 0.843 | 0.922 |
| 25 | 0.660 | 0.759 | 0.830 | 0.915 |
| 26 | 0.644 | 0.747 | 0.822 | 0.911 |
| 27 | 0.638 | 0.744 | 0.819 | 0.910 |
| 28 | 0.644 | 0.747 | 0.822 | 0.911 |
| 29 | 0.660 | 0.759 | 0.830 | 0.915 |
| 30 | 0.687 | 0.778 | 0.843 | 0.922 |
| 31 | 0.723 | 0.804 | 0.862 | 0.931 |
| 32 | 0.768 | 0.835 | 0.884 | 0.942 |
| 33 | 0.819 | 0.872 | 0.910 | 0.955 |
| 34 | 0.876 | 0.912 | 0.938 | 0.969 |
| 35 | 0.937 | 0.955 | 0.969 | 0.984 |

FIG. 16

| SWITCHING CYCLE | SWITCHING DUTY RATIO | | |
|---|---|---|---|
| | 100Vrms (10msec) | 70Vrms (6.67msec) | 30Vrms (3.33msec) |
| 0 | 0.000 | 0.000 | 0.000 |
| 1 | 0.063 | 0.000 | 0.000 |
| 2 | 0.124 | 0.000 | 0.000 |
| 3 | 0.181 | 0.000 | 0.000 |
| 4 | 0.232 | 0.094 | 0.000 |
| 5 | 0.277 | 0.181 | 0.000 |
| 6 | 0.313 | 0.256 | 0.000 |
| 7 | 0.340 | 0.313 | 0.181 |
| 8 | 0.356 | 0.349 | 0.313 |
| 9 | 0.362 | 0.362 | 0.362 |
| 10 | 0.356 | 0.349 | 0.313 |
| 11 | 0.340 | 0.313 | 0.181 |
| 12 | 0.313 | 0.256 | 0.000 |
| 13 | 0.277 | 0.181 | 0.000 |
| 14 | 0.232 | 0.094 | 0.000 |
| 15 | 0.181 | 0.000 | 0.000 |
| 16 | 0.124 | 0.000 | 0.000 |
| 17 | 0.063 | 0.000 | 0.000 |
| 18 | 1.000 | 1.000 | 1.000 |
| 19 | 0.937 | 1.000 | 1.000 |
| 20 | 0.876 | 1.000 | 1.000 |
| 21 | 0.819 | 1.000 | 1.000 |
| 22 | 0.768 | 0.906 | 1.000 |
| 23 | 0.723 | 0.819 | 1.000 |
| 24 | 0.687 | 0.744 | 1.000 |
| 25 | 0.660 | 0.687 | 0.819 |
| 26 | 0.644 | 0.651 | 0.687 |
| 27 | 0.638 | 0.638 | 0.638 |
| 28 | 0.644 | 0.651 | 0.687 |
| 29 | 0.660 | 0.687 | 0.819 |
| 30 | 0.687 | 0.744 | 1.000 |
| 31 | 0.723 | 0.819 | 1.000 |
| 32 | 0.768 | 0.906 | 1.000 |
| 33 | 0.819 | 1.000 | 1.000 |
| 34 | 0.876 | 1.000 | 1.000 |
| 35 | 0.937 | 1.000 | 1.000 |

FIG. 19

POWER SUPPLY UNIT AND IMAGE FORMING APPARATUS

CROSS REFERENCE TO RELATED APPLICATIONS

This application claims the benefit of Japanese Priority Patent Application JP2015-125667 filed on Jun. 23, 2015, the entire contents of which are incorporated herein by reference.

BACKGROUND

The invention relates to a power supply unit that supplies a load with electric power, and to an image forming apparatus that includes the power supply unit.

An image forming apparatus transfers a toner image formed on a photosensitive drum onto a recording medium and fixes the transferred toner image to the recording medium in a fixing section. The fixing section is provided with a heater, and applies heat and pressure to the recording medium and thereby fixes the toner image to the recording medium. To control a temperature of the heater, an effective value of an alternating-current signal to be supplied thereto may be controlled. In general, a phase control or a frequency control may be performed to control the effective value of the alternating-current signal. For example, Japanese Unexamined Patent Application Publication No. 2013-235107 discloses an image forming apparatus that uses a triac to perform the phase control upon supplying a heater with an alternating-current signal supplied from a commercial power supply.

SUMMARY

A conduction noise, a flicker, or both may be generated upon varying electric power to be supplied to a heater. What is therefore desired in the supply of electric power performed on the heater is to reduce a possibility of an occurrence of the conduction noise, the flicker, or both.

It is desirable to provide a power supply unit and an image forming apparatus that make it possible to reduce a possibility of an occurrence of a conduction noise, a flicker, or both.

A power supply unit according to an illustrative embodiment of the invention includes: a power factor correction circuit configured to generate, based on a first alternating-current signal, a direct-current signal; a synchronizing signal generator configured to generate, based on the first alternating-current signal, a synchronizing signal that is in synchronization with the first alternating-current signal; and an alternating-current signal generator including a switching section, and configured to generate, based on the direct-current signal, a second alternating-current signal. The switching section is configured to perform, based on the synchronizing signal, a switching operation. The second alternating-current signal has a variable effective voltage value.

An image forming apparatus according to an illustrative embodiment of the invention includes: a developing unit; a fixing unit including a heater, and configured to fix a developer to a recording medium; and a power supply unit configured to supply the heater with electric power. The power supply unit includes: a power factor correction circuit configured to generate, based on a first alternating-current signal, a direct-current signal; a synchronizing signal generator configured to generate, based on the first alternating-current signal, a synchronizing signal that is in synchronization with the first alternating-current signal; and an alternating-current signal generator including a switching section, and configured to generate, based on the direct-current signal, a second alternating-current signal. The switching section is configured to perform, based on the synchronizing signal, a switching operation. The second alternating-current signal has a variable effective voltage value.

BRIEF DESCRIPTION OF THE DRAWINGS

FIG. 11 describes an example of a configuration of a duty ratio table illustrated in FIG. 8.

FIG. 16 is a table illustrating an example of an operation of the DC-AC inverter illustrated in FIG. 4.

FIG. 19 is a table illustrating an example of an operation of the DC-AC inverter according to the modification example.

DETAILED DESCRIPTION

In the following, some example embodiments of the invention are described in detail with reference to the accompanying drawings. Note that the following description is directed to illustrative examples of the invention and not to be construed as limiting to the invention. Also, factors such as arrangement, dimensions, and a dimensional ratio of elements illustrated in each drawing are illustrative only and not to be construed as limiting to the invention.

Configuration Example

[Example of Overall Configuration]

Figure 1:
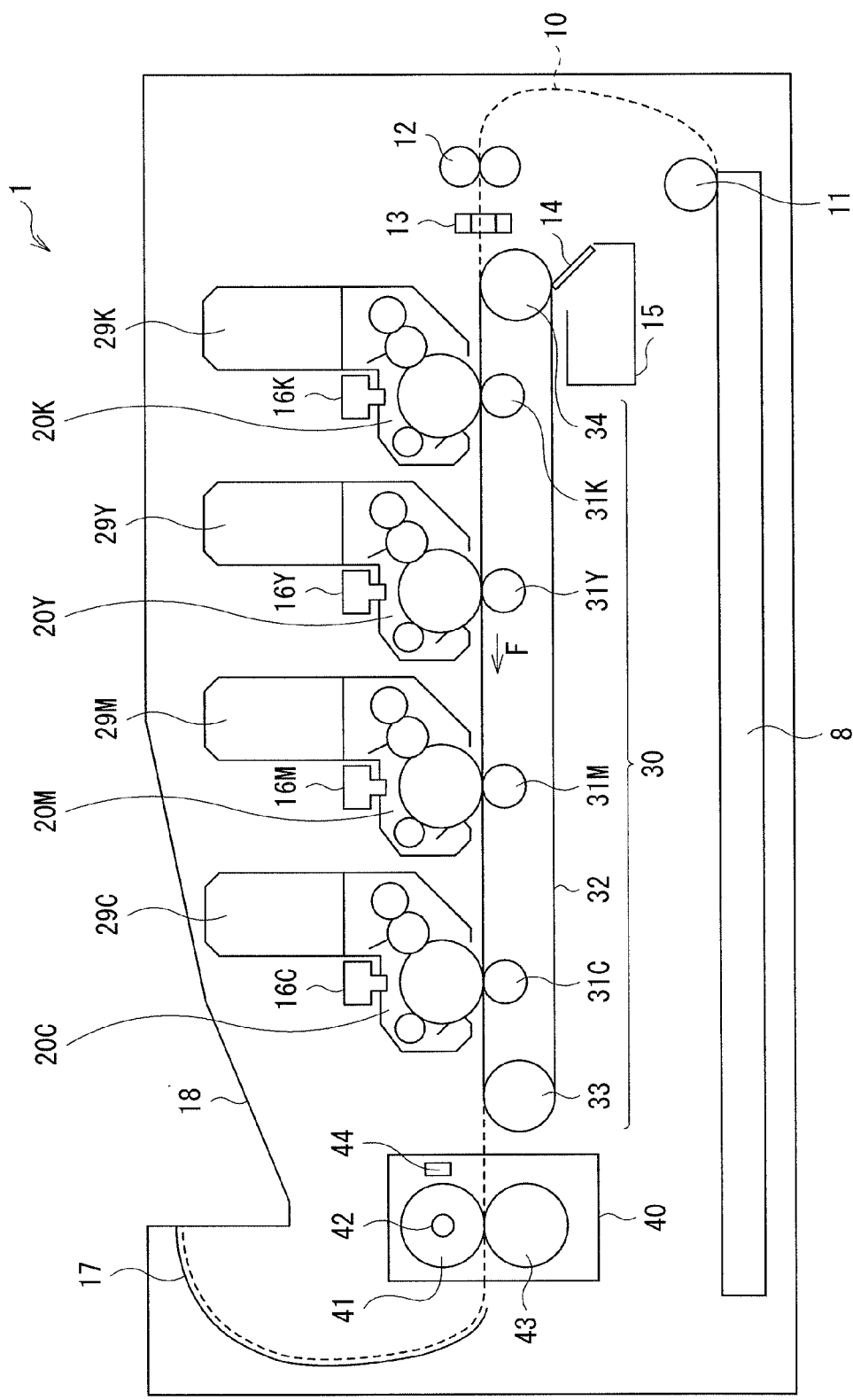
FIG. 1 illustrates an example of a configuration of an image forming apparatus according to an example embodiment of the invention.

FIG. 1 schematically illustrates an example of a configuration of an image forming apparatus (image forming apparatus 1) that includes a power supply unit according to an example embodiment of the invention. The image forming apparatus 1 may function as a printer that forms an image on a recording medium 9 with use of an electrophotographic process. The recording medium 9 may be, for example but not limited to, paper including plain paper or any other medium on which an image is to be formed.

Referring to FIG. 1, the image forming apparatus 1 may include a hopping roller 11, a resist roller 12, a medium sensor 13, developing sections 20, toner containers 29, exposure heads 16, a transfer section 30, and a fixing section 40. In this example embodiment, four developing sections 20 (developing sections 20C, 20M, 20Y, and 20K), four toner containers 29 (toner containers 29C, 29M, 29Y, and 29K), and four exposure heads 16 (16C, 16M, 16Y, and 16K) are provided, although the number of each of which is not limited thereto. These members may be disposed along a conveying path 10 along which the recording medium 9 is to be conveyed.

The hopping roller 11 may be a member that takes the recording medium 9 stored in a medium feeding cassette (paper feeding cassette) 8 out of the medium feeding cassette 8 one by one from the top, and feeds the taken out recording medium 9 to the conveying path 10. The medium feeding cassette 8 may be attachable to and detachable from the image forming apparatus 1. The hopping roller 11 may be rotated by means of drive power transmitted from a hopping motor 11T to be described later.

The resist roller 12 may be a member configured by a pair of rollers that are provided with the conveying path 10 interposed therebetween. The resist roller 12 may correct skew of the recording medium 9 fed from the hopping roller 11, and guide the corrected recording medium 9 to the developing section 20 along the conveying path 10. The resist roller 12 may be rotated by means of drive power transmitted from a resist motor 12T to be described later.

The medium sensor 13 may detect, in a contact fashion or in a contactless fashion, passing of the recording medium 9 therethrough.

The developing section 20 may form toner images. In one specific but non-limiting example, the developing section 20C may form a cyan (C) toner image, the developing section 20M may form a magenta (M) toner image, the developing section 20Y may form a yellow (Y) toner image, and the developing section 20K may form a black (K) toner image. In this example, the developing sections 20 may be disposed in order of the developing sections 20K, 20Y, 20M, and 20C in a conveying direction "F" of the recording medium 9. The developing sections 20 each may be attachable to and detachable from the image forming apparatus 1.

The toner container 29C may contain a cyan (C) toner, and may be attachable to and detachable from the developing section 20C. Similarly, the toner container 29M may contain a magenta (M) toner, and may be attachable to and detachable from the developing section 20M. The toner container 29Y may contain a yellow (Y) toner, and may be attachable to and detachable from the developing section 20Y. The toner container 29K may contain a black (K) toner, and may be attachable to and detachable from the developing section 20K.

Figure 2:
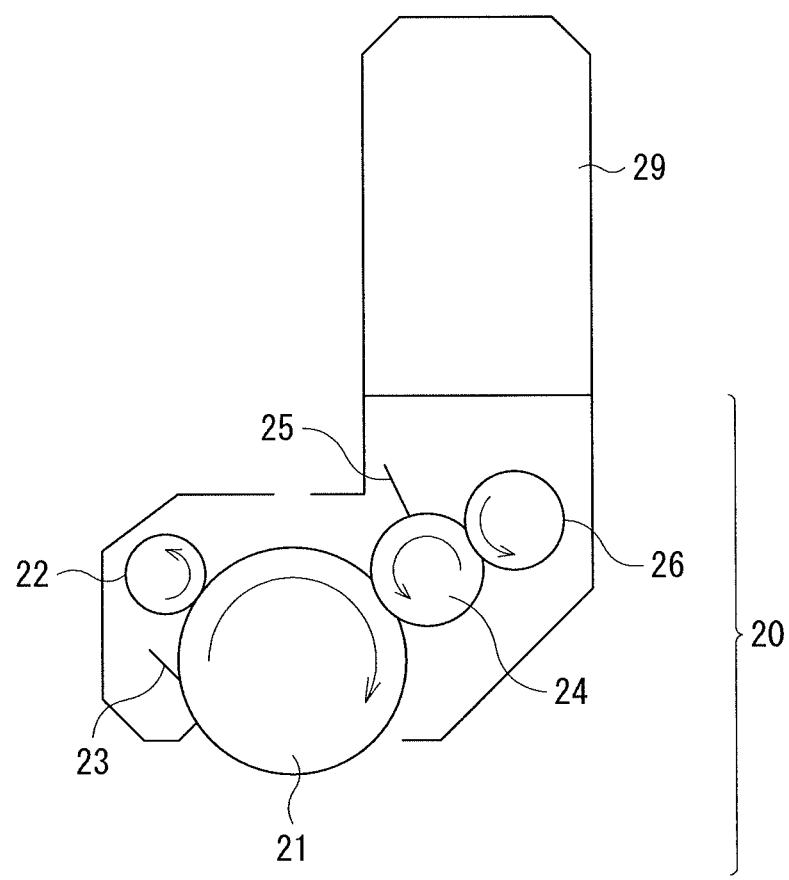
FIG. 2 illustrates an example of a configuration of a developing section illustrated in FIG. 1.

FIG. 2 illustrates an example of a configuration of any of the developing sections 20. It is to be noted that FIG. 2 depicts any of the toner containers 29 in addition to its corresponding developing section 20. The developing sections 20 each may include a photosensitive drum 21, a charging roller 22, a cleaning blade 23, a developing roller 24, a development blade 25, and a feeding roller 26.

The photosensitive drum 21 may be a member that supports an electrostatic latent image on a surface (a superficial part) of the photosensitive drum 21, and may include a photoreceptor. The photosensitive drum 21 may be rotated clockwise in the example embodiment by means of drive power transmitted from a drum motor 20T to be described later. The photosensitive drum 21 may be charged by the corresponding charging roller 22. The photosensitive drum 21 of the developing section 20C may be subjected to exposure by the exposure head 16C, and the photosensitive drum 21 of the developing section 20M may be subjected to exposure by the exposure head 16M. The photosensitive drum 21 of the developing section 20Y may be subjected to exposure by the exposure head 16Y, and the photosensitive drum 21 of the developing section 20K may be subjected to exposure by the exposure head 16K. In this way, the electrostatic latent images may be formed on the surfaces of the respective photosensitive drums 21.

The charging roller 22 may be a member that charges the surface (the superficial part) of the photosensitive drum 21. The charging roller 22 may be so disposed as to be in contact with the surface (a circumferential surface) of the photosensitive drum 21, and as to be pressed against the photosensitive drum 21 by a predetermined pressing amount. In the example embodiment, the charging roller 22 may be rotated counterclockwise in response to the rotation of the photosensitive drum 21. A charging voltage may be applied to the charging roller 22 by a high-voltage power supply section 55 to be described later.

The cleaning blade 23 may be a member that scrapes the toner remaining on the surface (the superficial part) of the photosensitive drum 21 to clean the surface of the photosensitive drum 21. The cleaning blade 23 may be so disposed to counter-face the photosensitive drum 21 as to come into contact with the surface of the photosensitive drum 21, i.e., protrude in a direction opposite to the direction of rotation of the photosensitive drum 21, and as to be pressed against the photosensitive drum 21 by a predetermined pressing amount.

The developing roller 24 may be a member that supports the toner on a surface of the developing roller 24. The developing roller 24 may be so disposed as to be in contact with the surface (the circumferential surface) of the photosensitive drum 21, and as to be pressed against the photosensitive drum 21 by a predetermined pressing amount. In the example embodiment, the developing roller 24 may be rotated counterclockwise by means of drive power transmitted from a drum motor 20T to be described later. On each of the photosensitive drums 21, the toner image corresponding to the electrostatic latent image may be formed or "developed" by the toner fed from the developing roller 24. A development voltage may be applied to the developing roller 24 by the high-voltage power supply section 55 to be described later.

The development blade 25 may be a member that comes into contact with the surface of the developing roller 24 to thereby form a layer made of the toner (i.e., a toner layer) on the surface of the developing roller 24 and regulate (control or adjust) a thickness of that toner layer. The development blade 25 may be a plate-shaped elastic member bent into an "L" shape. The plate-shaped elastic member may be made of, for example but not limited to, a stainless steel. The development blade 25 may be so disposed that a bent part of the development blade 25 comes into contact with the surface of the developing roller 24, and as to be pressed against the developing roller 24 by a predetermined pressing amount. A supply voltage may be applied to the development blade 25 by the high-voltage power supply section 55 to be described later.

The feeding roller 26 may be a member that feeds the toner stored in the toner container 29 to the developing roller 24. The feeding roller 26 may be so disposed as to be in contact with the surface (a circumferential surface) of the developing roller 24, and as to be pressed against the developing roller 24 by a predetermined pressing amount. In the example embodiment, the feeding roller 26 may be rotated counterclockwise by means of the drive power transmitted from the drum motor 20T to be described later. This causes a friction between a surface of the feeding roller 26 and the surface of the developing roller 24 in each of the developing sections 20, which in turn makes possible to electrically charge the toner by means of a so-called frictional electrification in each of the developing sections 20. The supply voltage may be applied to the feeding roller 26 by the high-voltage power supply section 55 to be described later.

Referring to FIG. 1, the exposure head 16C may be a member that irradiates the photosensitive drum 21 of the developing section 20C with light, and the exposure head 16M may be a member that irradiates the photosensitive drum 21 of the developing section 20M with light. The exposure head 16Y may be a member that irradiates the photosensitive drum 21 of the developing section 20Y with light, and the exposure head 16K may be a member that irradiates the photosensitive drum 21 of the developing section 20K with light. This causes the photosensitive drums 21 to be subjected to exposure by their respective exposure heads 16C, 16M, 16Y, and 16K, which in turn forms the electrostatic latent images on the surfaces of the respective photosensitive drums 21.

The transfer section 30 may be a member that transfers the toner images formed by the four developing sections 20C, 20M, 20Y, and 20K onto a transfer surface of the recording medium 9. The transfer section 30 may include transfer rollers 31C, 31M, 31Y, and 31K, a transfer belt 32, a drive roller 33, and a driven roller 34.

The transfer roller 31C may be disposed to face the photosensitive drum 21 of the developing section 20C with the conveying path 10 interposed in between, and the transfer roller 31M may be disposed to face the photosensitive drum 21 of the developing section 20M with the conveying path 10 interposed in between. The transfer roller 31Y may be disposed to face the photosensitive drum 21 of the developing section 20Y with the conveying path 10 interposed in between, and the transfer roller 31K may be disposed to face the photosensitive drum 21 of the developing section 20K with the conveying path 10 interposed in between. A transfer voltage may be applied to each of the transfer rollers 31C, 31M, 31Y, and 31K by the high-voltage power supply section 55 to be described later.

The transfer belt 32 may convey the recording medium 9 along the conveying path 10. The transfer belt 32 may be stretched by and stretched around the drive roller 33 and the driven roller 34. The transfer belt 32 may be rotated and thereby circulate in a direction toward the conveying direction F in response to rotation of the drive roller 33. Upon the circulation, the transfer belt 32 may travel through regions between the developing section 20C and the transfer roller 31C, between the developing section 20M and the transfer roller 31M, between the developing section 20Y and the transfer roller 31Y, and between the developing section 20K and the transfer roller 31K.

The drive roller 33 may cause the transfer belt 32 to circulate. In the example embodiment, the drive roller 33 may be disposed downstream of the four developing sections 20 in the conveying direction F, and rotated counterclockwise by means of drive power transmitted from a belt motor 33T to be described later, making it possible for the drive roller 33 to cause the transfer belt 32 to circulate in the direction toward the conveying direction F.

The driven roller 34 may be driven to rotate counterclockwise in response to the circulation of the transfer belt 32 and may be disposed upstream of the four developing sections 20 in the conveying direction F in the example embodiment.

The cleaning blade 14 may be a member that scrapes the toner remaining on a transfer surface of the transfer belt 32 to clean that transfer surface. The scraped toner may be stored in a cleaner container 15.

The fixing section 40 may be a member that applies heat and pressure to the recording medium 9 to thereby fix, to the recording medium 9, the toner images having been transferred onto the recording medium 9. The fixing section 40 may include a heat roller 41, a pressure-applying roller 43, and a thermistor 44. The heat roller 41 may be a member provided therein with a heater 42 and that applies the heat to the toners on the recording medium 9. The heater 42 may be, for example but not limited to, a halogen heater, a ceramic heater, or any other suitable heating device. The pressure-applying roller 43 may be a member so disposed as to form a pressurized region between the pressure-applying roller 43 and the heat roller 41, and that applies the pressure to the toners on the recording medium 9. The heat roller 41 and the pressure-applying roller 43 each may be rotated by means of drive power transmitted from a heater motor 40T to be described later. The thermistor 44 may detect a temperature of the fixing section 40. With this configuration, the toners on the recording medium 9 may be heated, melted, and pressurized in the fixing section 40, making it possible to fix the toner images to the recording medium 9.

In the image forming apparatus 1, printing may be performed in this way on the recording medium 9. The recording medium 9 having been subjected to the printing may be conveyed along the conveying path 10 by a medium guide 17 and stacked on a discharge tray 18.

[Control Mechanism of Image Forming Apparatus 1]

Figure 3:
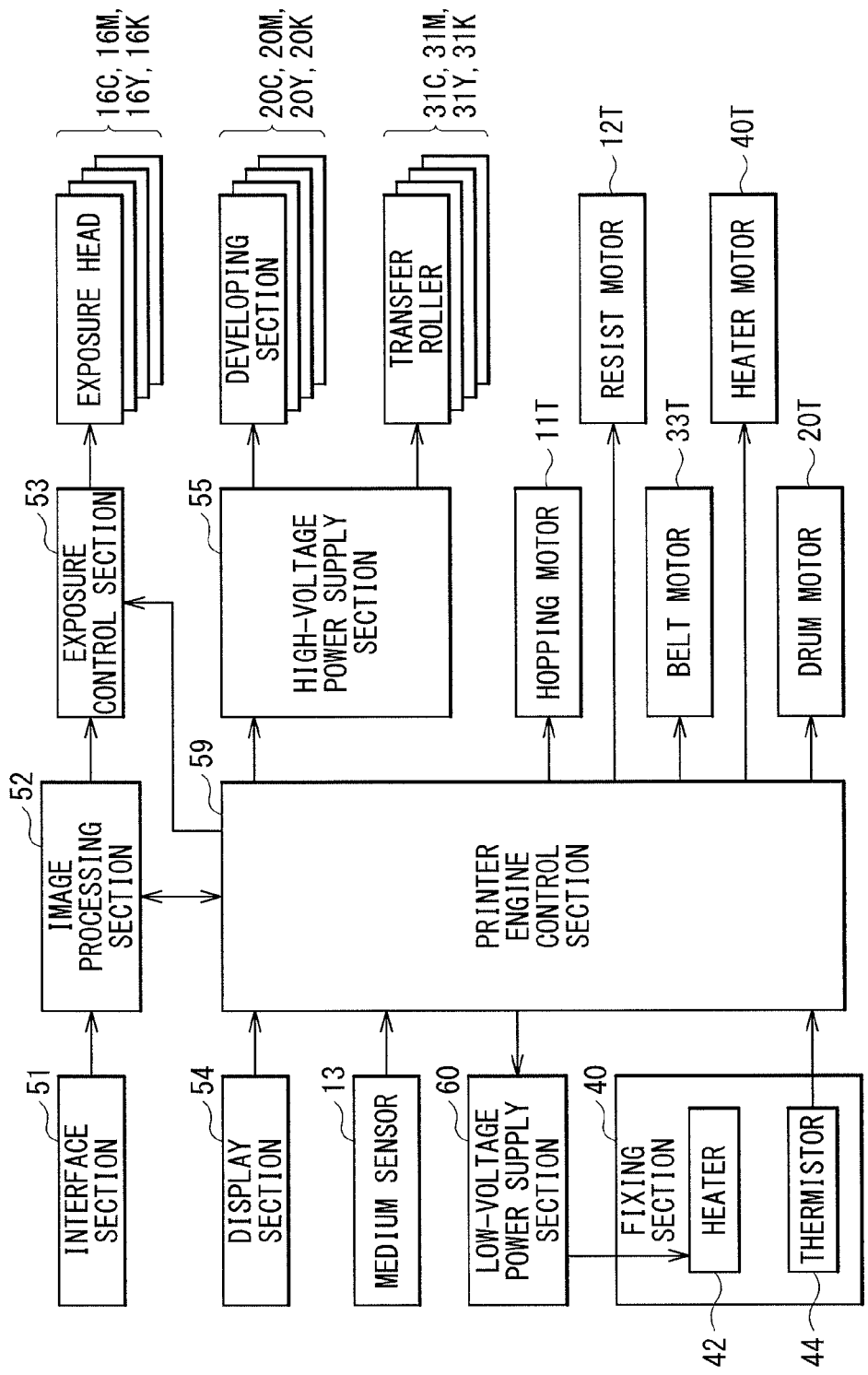
FIG. 3 is a block diagram illustrating an example of a control mechanism in the image forming apparatus illustrated in FIG. 1.

FIG. 3 illustrates an example of a control mechanism in the image forming apparatus 1. The image forming apparatus 1 may include an interface section 51, an image processing section 52, an exposure control section 53, a display section 54, the high-voltage power supply section 55, a low-voltage power supply section 60, and a printer engine control section 59.

The interface section 51 may receive printing data from, for example but not limited to, an unillustrated host computer. The printing data may be described in, for example but not limited to, Page Description Language (PDL). The interface section 51 may also exchange various control signals between the interface section 51 and the host computer.

The image processing section 52 may notify the printer engine control section 59 of the reception of the printing data. The image processing section 52 may also perform, in response to instructions given from the printer engine control section 59, a predetermined process on the basis of the printing data supplied from the interface section 51 to thereby generate bitmap data.

The exposure control section 53 may control an operation of each of the exposure heads 16C, 16M, 16Y, and 16K, based on the instructions given from the printer engine control section 59 and on the bitmap data supplied from the image processing section 52.

The display section 54 may display information such as, but not limited to, a state of operation of the image forming apparatus 1. The display section 54 may be, for example but not limited to, a liquid crystal display.

The high-voltage power supply section 55 may generate, based on the instructions given from the printer engine control section 59, the charge voltages to be applied to the charging rollers 22 of the respective developing sections 20C, 20M, 20Y, and 20K, the development voltages to be applied to the developing rollers 24 of the respective developing sections 20C, 20M, 20Y, and 20K, the supply voltages to be applied to the feeding rollers 26 of the respective developing sections 20C, 20M, 20Y, and 20K, and the transfer voltages to be applied to the respective transfer rollers 31C, 31M, 31Y, and 31K.

The low-voltage power supply section 60 may supply the heater 42 of the fixing section 40 with electric power, based on the instructions given from the printer engine control section 59. A description of the low-voltage power supply section 60 will be given later in greater detail.

The printer engine control section 59 may control each block provided in the image forming apparatus 1. In one specific but non-limiting example, the printer engine control section 59 may control the image processing section 52 to generate the bitmap data, based on the printing data. Further, the printer engine control section 59 may control the low-voltage power supply section 60 to cause the low-voltage power supply section 60 to supply the electric power to the heater 42 in the fixing section 40, and may adjust the electric power to be supplied to the heater 42, based on a result of the detection obtained from the thermistor 44. The printer engine control section 59 may control the hopping motor 11T to rotate the hopping roller 11, may control the resist motor 12T to rotate the resist roller 12, may control the drum motor 20T to rotate the photosensitive drum 21, the developing roller 24, and the feeding roller 26 provided in each of the developing sections 20C, 20M, 20Y, and 20K, may control the belt motor 33T to rotate the drive roller 33, and may control the heater motor 40T to rotate the heat roller 41 and the pressure-applying roller 43. The printer engine control section 59 may control the high-voltage power supply section 55 to generate the various voltages, based on a result of the detection obtained from the medium sensor 13. The printer engine control section 59 may control an operation of the exposure control section 53 to operate each of the exposure heads 16C, 16M, 16Y, and 16K. The printer engine control section 59 may also control the display section 54 to display a state of operation of the image forming apparatus 1 or any other information.

The printer engine control section 59 may, upon controlling the low-voltage power supply section 60, supply the low-voltage power supply section 60 with a power command signal CTL and an output enable signal ENB. The power command signal CTL may be directed to instructions on an amount of electric power to be supplied to the heater 42. The output enable signal ENB may be directed to instructions on whether to perform the supply of electric power to the heater 42. In one specific but non-limiting example, the printer engine control section 59 may instruct, using the power command signal CTL and the output enable signal ENB, the low-voltage power supply section 60 to make a temperature of the heater 42 constant, based on the detection result obtained from the thermistor 44. Also, the printer engine control section 59 may instruct, using the power command signal CTL, the low-voltage power supply section 60 to gradually increase the amount of electric power to be supplied to the heater 42 upon, for example but not limited to, starting the supply of electric power to the heater 42. This may be performed from a viewpoint of a large inrush current resulting from a low resistance value of the heater 42 upon initiation of electric conduction of the heater 42 which is not warmed up. To address an occurrence of large inrush current, the printer engine control section 59 may set the amount of electric power to be supplied to the heater 42 to be low in the initial stage, following which the printer engine control section 59 may increase the amount of electric power when there is an decrease in current resulting from warm up of the heater 42. In this manner, the printer engine control section 59 may gradually increase the amount of electric power to be supplied to the heater 42 upon, for example, starting the supply of electric power to the heater 42.

[Low-Voltage Power Supply Section 60]

Figure 4:
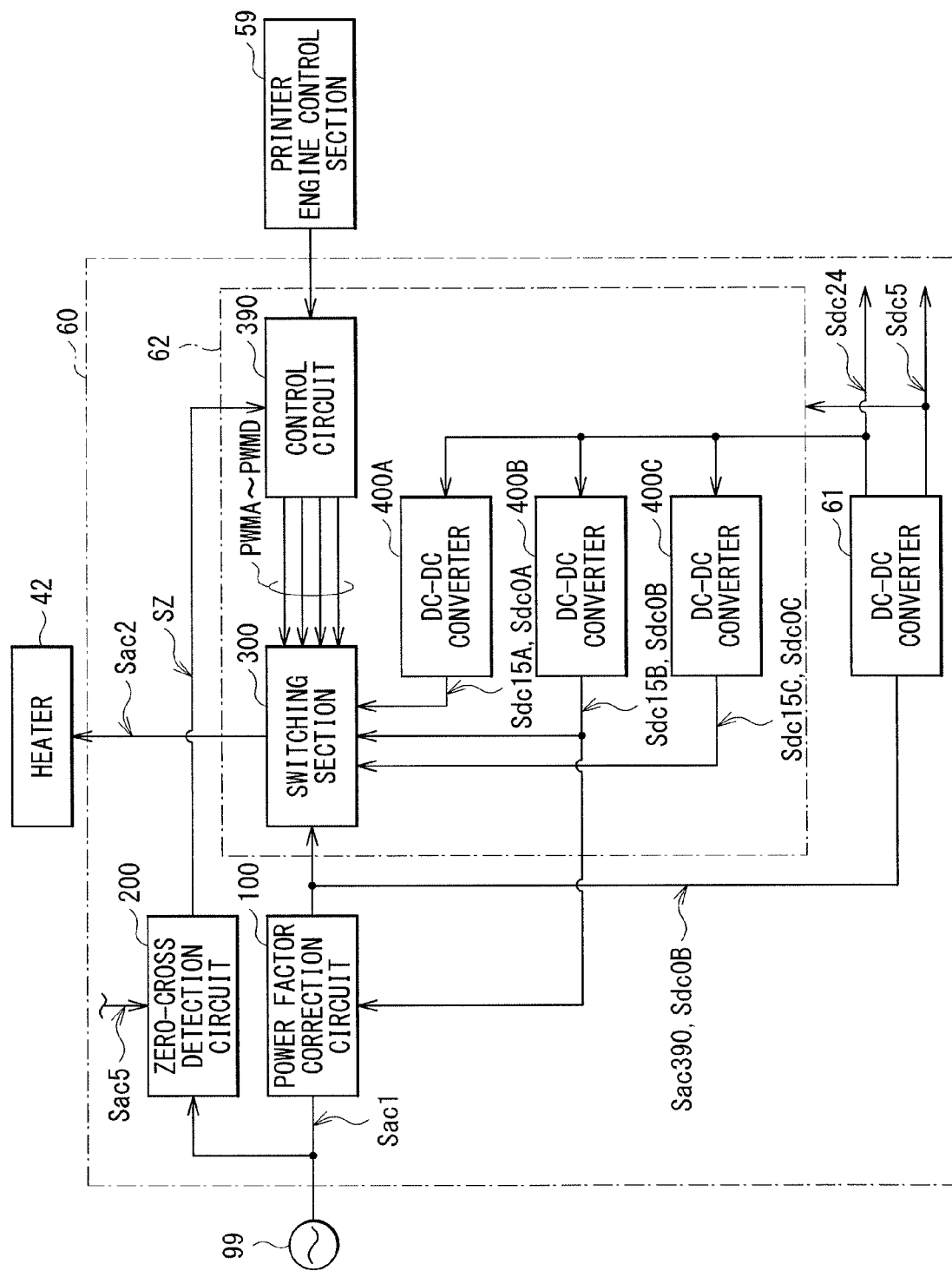
FIG. 4 is a block diagram illustrating an example of a configuration of a low-voltage power supply section illustrated in FIG. 3.

FIG. 4 illustrates an example of a configuration of the low-voltage power supply section 60. FIG. 4 also depicts a commercial power supply 99, the heater 42, and the printer engine control section 59, in addition to the low-voltage power supply section 60. The low-voltage power supply section 60 may generate, based on an alternating-current signal Sac1 supplied from the commercial power supply 99, an alternating-current signal Sac2, and may supply the generated alternating-current signal Sac2 to the heater 42. In this example embodiment, a frequency and an effective value of the alternating-current signal Sac1 supplied from the commercial power supply 99 may respectively be 50 Hz and 100 Vrms. It is to be noted that the frequency and the effective value of the alternating-current signal Sac1 are not limited thereto; the frequency may be, for example but not limited to, 60 Hz, and the effective value may be, for example but not limited to, 200 Vrms. The low-voltage power supply section 60 may include a power factor correction circuit 100, a zero-cross detection circuit 200, a DC-DC converter 61, and a DC-AC inverter 62.

[Power Factor Correction Circuit 100]

The power factor correction circuit 100 may generate a signal Sdc390, based on the alternating-current signal Sac1. In this example embodiment, the signal Sdc390 may have a voltage of 390 V. It is to be noted that the voltage thereof is not limited thereto; the signal Sdc390 may have any voltage other than 390 V. In the following, a description is given in detail of the power factor correction circuit 100.

Figure 5:
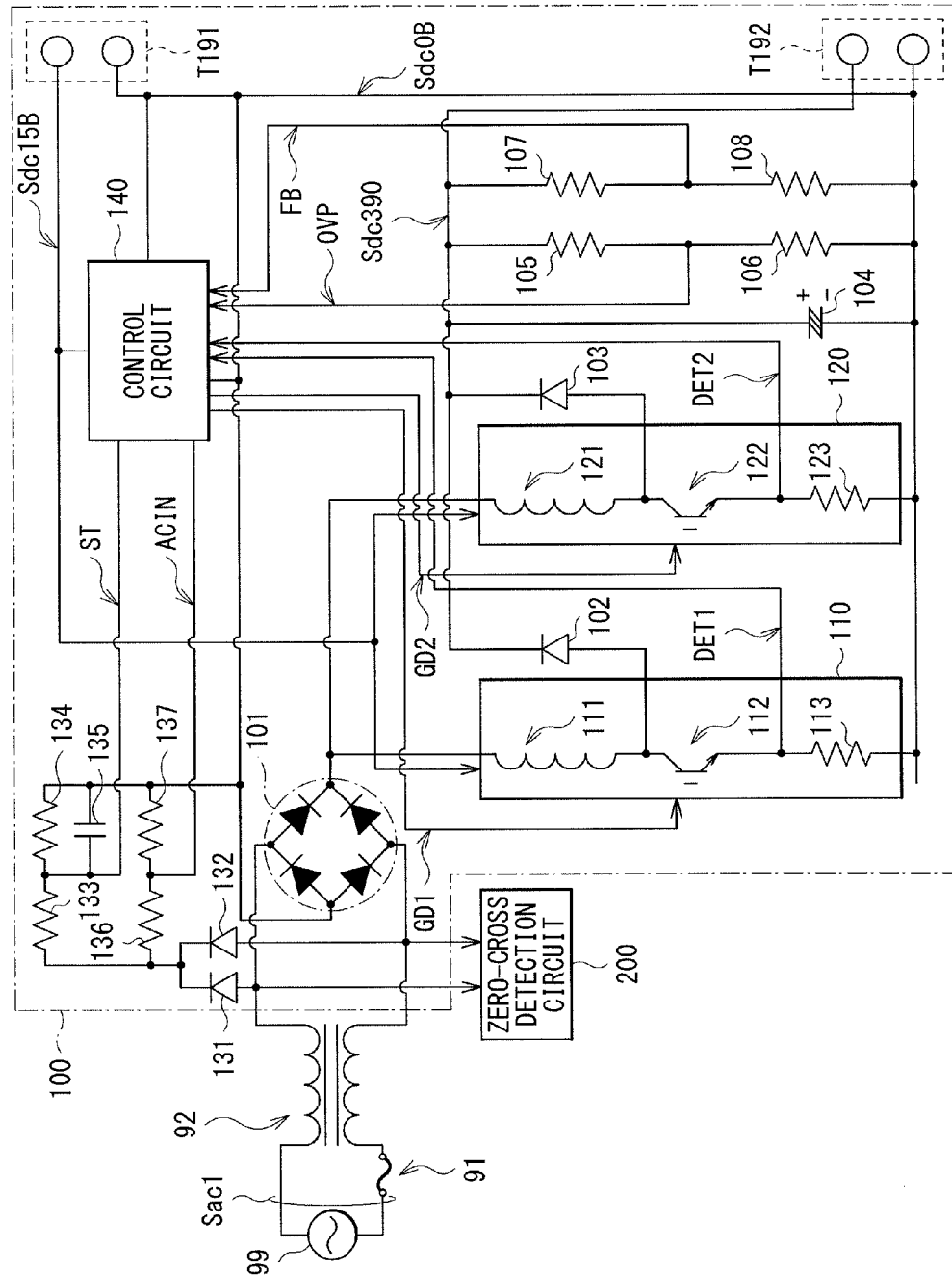
FIG. 5 is a circuit diagram illustrating an example of a configuration of a power factor correction circuit illustrated in FIG. 4.

FIG. 5 illustrates an example of a configuration of the power factor correction circuit 100. The power factor correction circuit 100 may be coupled to the commercial power supply 99 through a fuse 91 and a common mode choke coil 92. In one specific but non-limiting example, the commercial power supply 99 may have a first end coupled to a first end of a first winding of the common mode choke coil 92, and a second end coupled to a first end of the fuse 91. The fuse 91 may have the first end coupled to the second end of the commercial power supply 99, and a second end coupled to a first end of a second winding of the common mode choke coil 92. The common mode choke coil 92 may include the first winding that has the first end coupled to the first end of the commercial power supply 99, and that has a second end coupled to the power factor correction circuit 100 and the zero-cross detection circuit 200. The common mode choke coil 92 may include the second winding that has the first end coupled to the second end of the fuse 91, and that has a second end coupled to the power factor correction circuit 100 and the zero-cross detection circuit 200.

The power factor correction circuit 100 may include a bridge diode 101, switching circuits 110 and 120, diodes 102 and 103, an electrolytic capacitor 104, resistors 105 to 108, diodes 131 and 132, resistors 133 and 134, a capacitor 135, resistors 136 and 137, and a control circuit 140. The power factor correction circuit 100 may receive signals Sdc15B and Sdc0B from a later-described DC-DC converter 400B through a terminal T191. The signal Sdc15B may have a voltage higher than a voltage of the signal Sdc0B by 15 V without limitation. The power factor correction circuit 100 may output signals Sdc390 and Sdc0B through a terminal T192.

The bridge diode 101 may perform a full-wave rectification on an alternating-current signal outputted from the common mode choke coil 92. A cathode of a first diode and an anode of a second diode of the bridge diode 101 may be coupled to the second end of the first winding of the common mode choke coil 92, whereas a cathode of a third diode and an anode of a fourth diode of the bridge diode 101 may be coupled to the second end of the second winding of the common mode choke coil 92. An anode of the first diode and an anode of the third diode of the bridge diode 101 each may receive the signal Sdc0B. A cathode of the second diode and a cathode of the fourth diode of the bridge diode 101 each may be coupled to the switching circuits 110 and 120.

The switching circuit 110 may perform a switching operation, based on a gate drive signal GD1.

Figure 6:
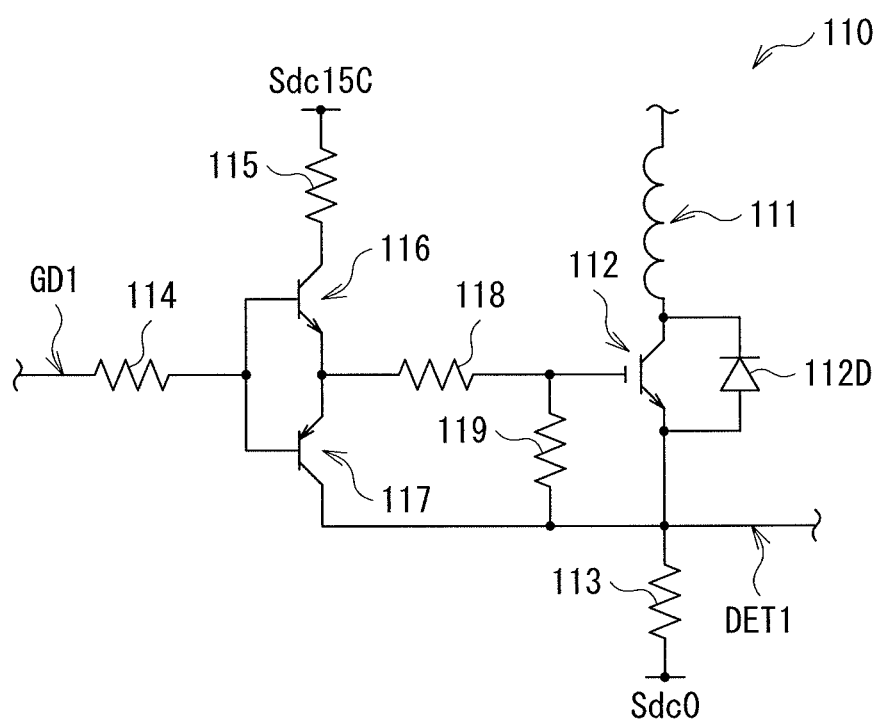
FIG. 6 is a circuit diagram illustrating an example of a configuration of a switching circuit illustrated in FIG. 5.

FIG. 6 illustrates an example of a configuration of the switching circuit 110. The switching circuit 110 may include resistors 114 and 115, a NPN transistor 116, a PNP transistor 117, resistors 118 and 119, an inductor 111, an IGBT (Insulated Gate Bipolar Transistor) 112, a diode 112D, and a resistor 113. It is to be noted that FIG. 5 depicts the inductor 111, the IGBT 112, and the resistor 113 among the elements mentioned above.

The resistor 114 may have a first end that receives a gate drive signal GD1, and a second end coupled to a base of the NPN transistor 116 and a base of the PNP transistor 117. The resistor 115 may have a first end that receives the signal Sdc15B, and a second end coupled to a collector of the NPN transistor 116. The NPN transistor 116 may have the collector coupled to the second end of the resistor 115, the base coupled to the second end of the resistor 114 and the base of the PNP transistor 117, and an emitter coupled to an emitter of the PNP transistor 117 and a first end of the resistor 118. The PNP transistor 117 may have the emitter coupled to the emitter of the NPN transistor 116 and the first end of the resistor 118, the base coupled to the second end of the resistor 114 and the base of the NPN transistor 116, and a collector coupled to a second end of the resistor 119, an emitter of the IGBT 112, an anode of the diode 112D, and a first end of the resistor 113. The resistor 118 may have the first end coupled to the emitter of the NPN transistor 116 and the emitter of the PNP transistor 117, and a second end coupled to a first end of the resistor 119 and a base of the IGBT 112. The resistor 119 may have the first end coupled to the second end of the resistor 118 and the base of the IGBT 112, and the second end coupled to the collector of the PNP transistor 117, the emitter of the IGBT 112, the anode of the diode 112D, and the first end of the resistor 113. The inductor 111 may have a first end coupled to the cathode of the second diode and the cathode of the fourth diode of the bridge diode 101 as illustrated in FIG. 5, and a second end coupled to a collector of the IGBT 112 and a cathode of the diode 112D. The IGBT 112 may have the collector coupled to the second end of the inductor 111 and the cathode of the diode 112D, the base coupled to the second end of the resistor 118 and the first end of the resistor 119, and the emitter coupled to the collector of the PNP transistor 117, the second end of the resistor 119, the anode of the diode 112D, and the first end of the resistor 113. The diode 112D may have the anode coupled to the emitter of the IGBT 112, the collector of the PNP transistor 117, the second end of the resistor 119, and the first end of the resistor 113, and the cathode coupled to the second end of the inductor 111 and the collector of the IGBT 112. The resistor 113 may have the first end coupled to the collector of the PNP transistor 117, the second end of the resistor 119, the emitter of the IGBT 112, and the anode of the diode 112D, and a second end that receives the signal Sdc0B. A voltage at the first end of the resistor 113 may be supplied as a signal DET1 to the control circuit 140.

The switching circuit 120 as illustrated in FIG. 5 may perform a switching operation, based on a gate drive signal GD2. The switching circuit 120 may have a configuration similar to the configuration of the switching circuit 110 illustrated in FIG. 6. The switching circuit 120 may include an inductor 121, an IGBT 122, and a resistor 123. The inductor 121, the IGBT 122, and the resistor 123 may respectively correspond to the inductor 111, the IGBT 112, and the resistor 113 in the switching circuit 110. A voltage at a first end of the resistor 123 may be supplied as a signal DET2 to the control circuit 140.

The diode 102 may have an anode coupled to the second end of the inductor 111 and any other element, and a cathode coupled to a cathode of the diode 103, a positive terminal of the electrolytic capacitor 104, a first end of the resistor 105, and a first end of the resistor 107. The diode 103 may have an anode coupled to the second end of the inductor 121 and any other element, and the cathode coupled to the cathode of the diode 102, the positive terminal of the electrolytic capacitor 104, the first end of the resistor 105, and the first end of the resistor 107. The electrolytic capacitor 104 may have the positive terminal coupled to the cathode of the diode 102, the cathode of the diode 103, the first end of the resistor 105, and the first end of the resistor 107, and a negative terminal that receives the signal Sdc0B. A voltage at the positive terminal of the electrolytic capacitor 104 may be outputted as the signal Sdc390 through the terminal T192.

The resistor 105 may have the first end coupled to the cathode of the diode 102, the cathode of the diode 103, the positive terminal of the electrolytic capacitor 104, and the first end of the resistor 107, and a second end coupled to a first end of the resistor 106. The resistor 106 may have the first end coupled to the second end of the resistor 105, and a second end that receives the signal Sdc0B. A voltage at the second end of the resistor 105 and at the first end of the resistor 106 may be supplied as a signal OVP to the control circuit 140.

The resistor 107 may have the first end coupled to the cathode of the diode 102, the cathode of the diode 103, the positive terminal of the electrolytic capacitor 104, and the first end of the resistor 105, and a second end coupled to a first end of the resistor 108. The resistor 108 may have the first end coupled to the second end of the resistor 107, and a second end that receives the signal Sdc0B. A voltage at the second end of the resistor 107 and at the first end of the resistor 108 may be supplied as a signal FB to the control circuit 140.

The diodes 131 and 132 may form a circuit that performs a full-wave rectification on the alternating-current signal outputted from the common mode choke coil 92. The diode 131 may have an anode coupled to the second end of the first winding of the common mode choke coil 92, and a cathode coupled to a cathode of the diode 132, a first end of the resistor 133, and a first end of the resistor 136. The diode 132 may have an anode coupled to the second end of the second winding of the common mode choke coil 92, and the cathode coupled to the cathode of the diode 131, the first end of the resistor 133, and the first end of the resistor 136.

The resistor 133 may have the first end coupled to the cathode of the diode 131, the cathode of the diode 132, and the first end of the resistor 136, and a second end coupled to a first end of the resistor 134 and a first end of the capacitor 135. The resistor 134 may have the first end coupled to the second end of the resistor 133 and the first end of the capacitor 135, and a second end that receives the signal Sdc0B. The capacitor 135 may have the first end coupled to the second end of the resistor 133 and the first end of the resistor 134, and a second end that receives the signal Sdc0B. A voltage at the second end of the resistor 133, at the first end of the resistor 134, and at the first end of the capacitor 135 may be supplied as a signal ST to the control circuit 140.

The resistor 136 may have the first end coupled to the cathode of the diode 131, the cathode of the diode 132, and the first end of the resistor 133, and a second end coupled to a first end of the resistor 137. The resistor 137 may have the first end coupled to the second end of the resistor 136, and a second end that receives the signal Sdc0B. A voltage at the second end of the resistor 136 and at the first end of the resistor 137 may be supplied as a signal ACIN to the control circuit 140.

The control circuit 140 may supply the switching circuit 110 and the switching circuit 120 with the gate drive signal GD1 and the gate drive signal GD2, respectively, to so control the power factor correction circuit 100 as to generate the signal Sdc390. In one specific but non-limiting example, the control circuit 140 may vary, based on the signal FB, a switching duty ratio of each of the gate drive signals GD1 and GD2 to so control the voltage of the signal Sdc390 as to be a desired voltage (which can be 390 V although it is not limited thereto). The control circuit 140 may also so control, based on the signal OVP, the voltage of the signal Sdc390 as to prevent the voltage thereof from being excessive. Upon controlling the power factor correction circuit 100, the control circuit 140 may so control, based on the signal ACIN, the switching operation performed by each of the switching circuits 110 and 120 as to allow a power factor to be close to 1 (one), e.g., to be 0.9 or greater without limitation.

The control circuit 140 may also have a function to monitor, based on the signal DET1, whether an excessive current flows to the IGBT 112, and monitor, based on the signal DET2, whether an excessive current flows to the IGBT 122. The control circuit 140 may stop the switching operation of each of the switching circuits 110 and 120 upon the presence of flow of the excessive current. Further, the control circuit 140 may allow the switching circuits 110 and 120 to perform their switching operations upon amplitude of the alternating-current signal Sac1 of equal to or greater than predetermined amplitude.

[Zero-Cross Detection Circuit 200]

The zero-cross detection circuit 200 as illustrated in FIG. 4 may generate a zero-cross signal SZ, based on the alternating-current signal Sac1. In the following, a description is given in detail of the zero-cross detection circuit 200.

Figure 7:
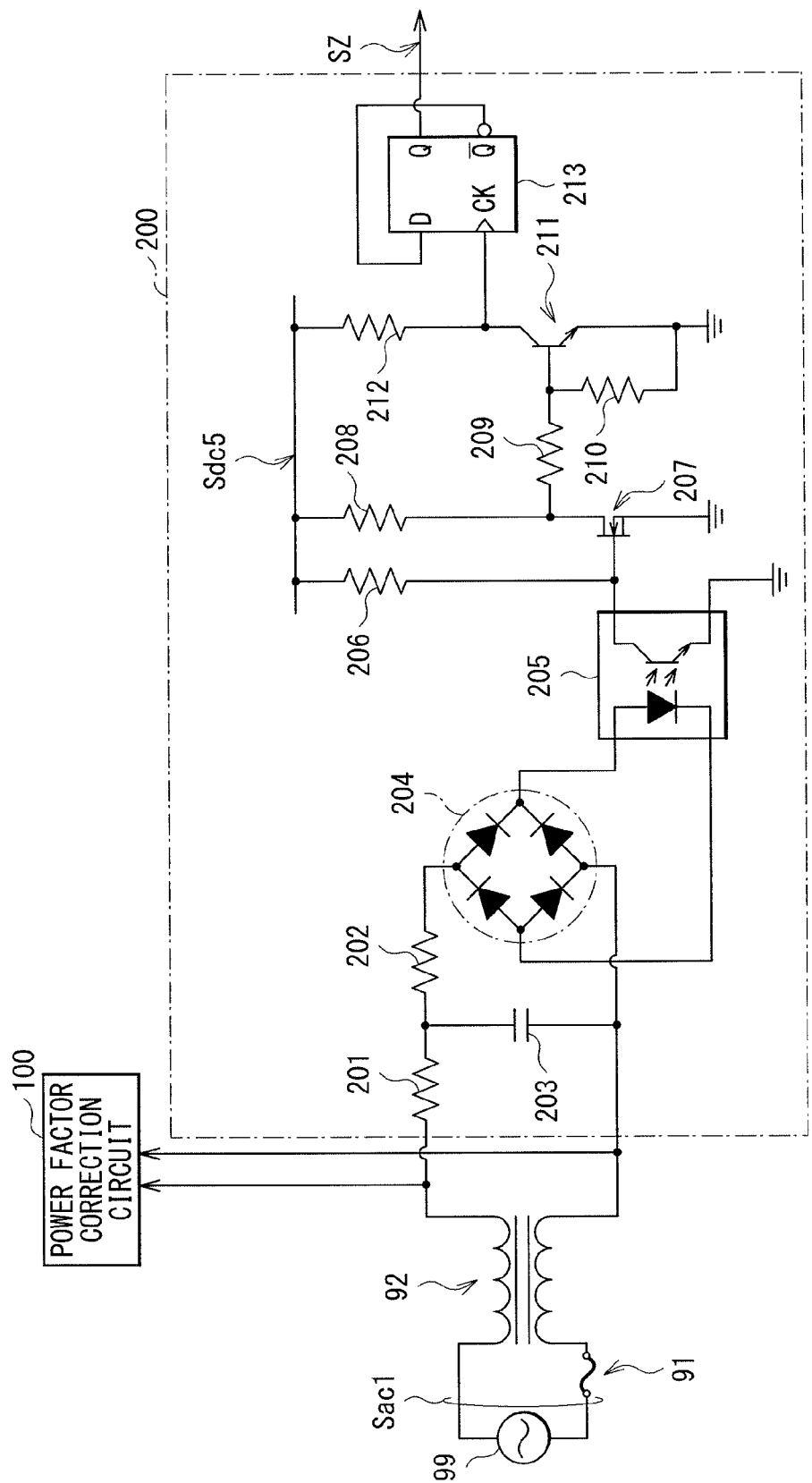
FIG. 7 is a circuit diagram illustrating an example of a configuration of a zero-cross detection circuit illustrated in FIG. 4.

FIG. 7 illustrates an example of a configuration of the zero-cross detection circuit 200. As with the power factor correction circuit 100, the zero-cross detection circuit 200 may be coupled to the commercial power supply 99 through the fuse 91 and the common mode choke coil 92.

The zero-cross detection circuit 200 may include resistors 201 and 202, a capacitor 203, a bridge diode 204, a photo coupler 205, a resistor 206, an N-channel FET (Field-Effect Transistor) 207, resistors 208 to 210, an NPN transistor 211, a resistor 212, and a D flip-flop 213. The zero-cross detection circuit 200 may receive a signal Sdc5 from the DC-DC converter 61. The signal Sdc5 may have a voltage of 5 V in this example embodiment without limitation.

The resistor 201 may have a first end coupled to the second end of the first winding of the common mode choke coil 92, and a second end coupled to a first end of the resistor 202 and a first end of the capacitor 203. The resistor 202 may have the first end coupled to the second end of the resistor 201 and the first end of the capacitor 203, and a second end coupled to a cathode of a first diode and an anode of a second diode of the bridge diode 204. The capacitor 203 may have the first end coupled to the second end of the resistor 201 and the first end of the resistor 202, and a second end coupled to the second end of the second winding of the common mode choke coil 92 and a cathode of a third diode and an anode of a fourth diode of the bridge diode 204.

The bridge diode 204 may perform a full-wave rectification on a signal between the second end of the resistor 202 and the second end of the capacitor 203. The cathode of the first diode and the anode of the second diode of the bridge diode 204 may be coupled to the second end of the resistor 202, whereas the cathode of the third diode and the anode of the fourth diode of the bridge diode 204 may be coupled to the second end of the capacitor 203. An anode of the first diode and an anode of the third diode of the bridge diode 204 may be coupled to a cathode of a light-emitting diode of the photo coupler 205. A cathode of the second diode and a cathode of the fourth diode of the bridge diode 204 may be coupled to an anode of the light-emitting diode of the photo coupler 205.

The anode of the light-emitting diode of the photo coupler 205 may be coupled to the cathode of the second diode and the cathode of the fourth diode of the bridge diode 204, whereas the cathode of the light-emitting diode may be coupled to the anode of the first diode and the anode of the third diode of the bridge diode 204. An emitter of a photo diode of the photo coupler 205 may be grounded, and a collector of the photo diode may be coupled to a second end of the resistor 206 and a gate of the N-channel FET 207.

The resistor 206 may have a first end that receives the signal Sdc5, and the second end coupled to the collector of the photo diode of the photo coupler 205 and the gate of the N-channel FET 207. The N-channel FET 207 may have a drain coupled to a second end of the resistor 208 and a first end of the resistor 209, the gate coupled to the collector of the photo diode of the photo coupler 205 and the second end of the resistor 206, and a source that may be grounded. The resistor 208 may have a first end that receives the signal Sdc5, and the second end coupled to the drain of the N-channel FET 207 and the first end of the resistor 209. The resistor 209 may have the first end coupled to the drain of the N-channel FET 207 and the second end of the resistor 208, and a second end coupled to a base of the NPN transistor 211 and a first end of the resistor 210. The resistor 210 may have the first end coupled to the second end of the resistor 209 and the base of the NPN transistor 211, and a second end that may be grounded. The NPN transistor 211 may have a collector coupled to a second end of the resistor 212 and a clock input terminal of the D flip-flop 213, the base coupled to the second end of the resistor 209 and the first end of the resistor 210, and an emitter that may be grounded. The resistor 212 may have a first end that receives the signal Sdc5, and the second end coupled to the collector of the NPN transistor 211 and the clock input terminal of the D flip-flop 213.

The D flip-flop 213 may have the clock input terminal coupled to the second end of the resistor 212 and the collector of the NPN transistor 211, an inversion data output terminal, and a data input terminal coupled to the inversion data output terminal. The D flip-flop 213 may also have a data output terminal from which the D flip-flop 213 outputs the zero-cross signal SZ.

With this configuration, the zero-cross detection circuit 200 may generate the zero-cross signal SZ. The zero-cross signal SZ may be inverted for each zero-cross timing of the alternating-current signal Sac1.

[DC-DC Converter 61]

The DC-DC converter 61 as illustrated in FIG. 4 may generate a signal Sdc24 and the signal Sdc5, based on the signal Sdc390. The signal Sdc24 may have a voltage of 24 V in this example embodiment without limitation. The signals Sdc24 and Sdc5 may be used in various blocks provided in the image forming apparatus 1. The DC-DC converter 61 may have a configuration that utilizes a known technology.

[DC-AC Inverter 62]

The DC-AC inverter 62 may generate the alternating-current signal Sac2, based on the signal Sdc390, the zero-cross signal SZ, and the instructions given from the printer engine control section 59. In one specific but non-limiting example, the DC-AC inverter 62 may generate, based on the signal Sdc390 and the zero-cross signal SZ, the alternating-current signal Sac2 that may be in synchronization with a phase of the alternating-current signal Sac1, as described later. Upon generating the alternating-current signal Sac2, the DC-AC inverter 62 may set an effective value of the alternating-current signal Sac2, based on the power command signal CTL included in the instructions given from the printer engine control section 59. The DC-AC inverter 62 may also have a function of generating the alternating-current signal Sac2 or stopping the generation of the alternating-current signal Sac2, based on the output enable signal ENB included in the instructions given from the printer engine control section 59. The DC-AC inverter 62 may include DC-DC converters 400A, 400B, and 400C, a switching section 300, and a control circuit 390.

The DC-DC converter 400A may generate a signal Sdc15A and a signal Sdc0A, based on the signal Sdc24. The DC-DC converter 400B may generate the signal Sdc15B and the signal Sdc0B, based on the signal Sdc24. The DC-DC converter 400C may generate a signal Sdc15C and a signal Sdc0C, based on the signal Sdc24. The signal Sdc15A may have a voltage higher than a voltage of the signal Sdc0A by 15 V without limitation. The signal Sdc15C may have a voltage higher than a voltage of the signal Sdc0C by 15 V without limitation.

The switching section 300 may generate the alternating-current signal Sac2, based on the signal Sdc390 and PWM signals PWMA, PWMB, PWMC, and PWMD.

Figure 8:
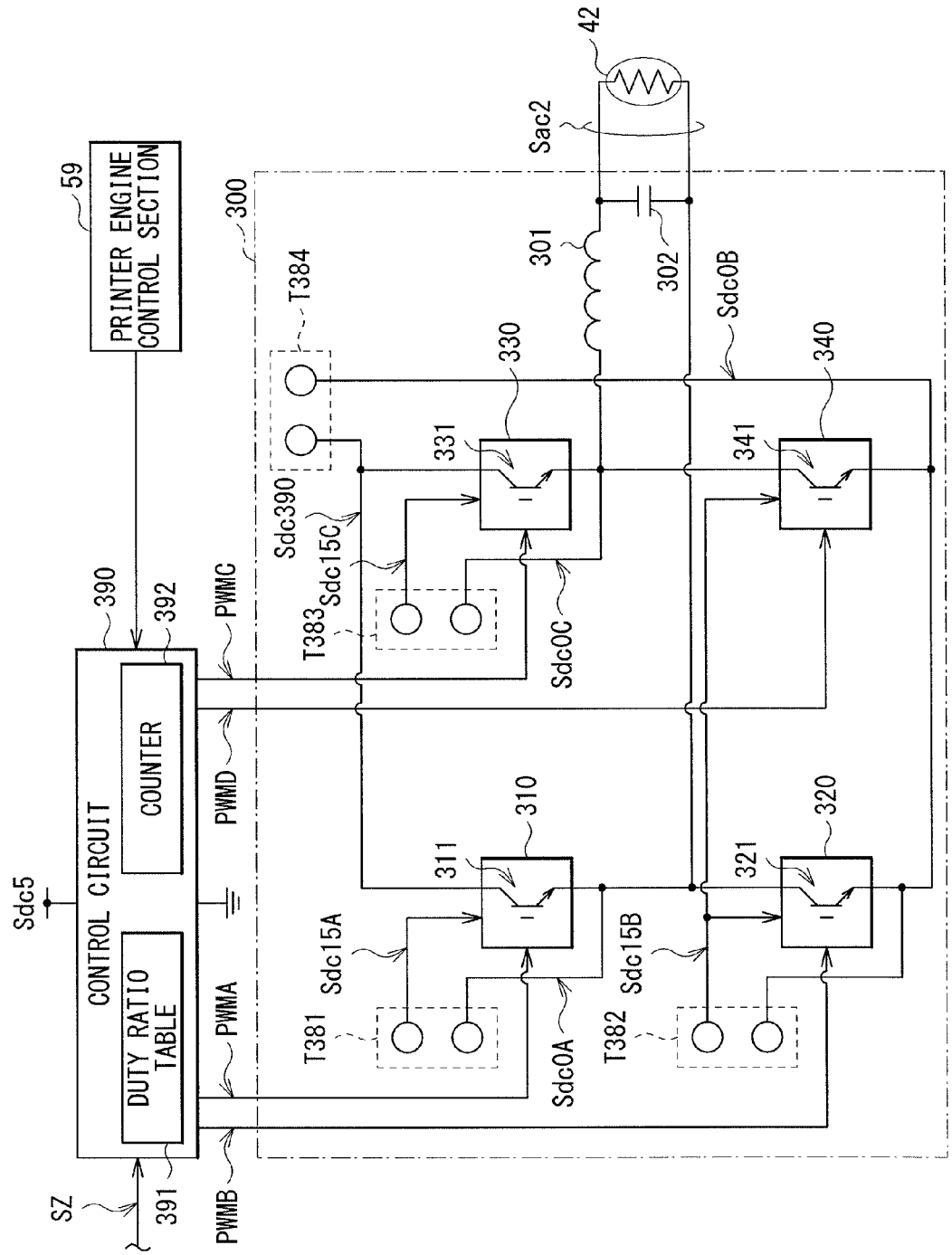
FIG. 8 is a circuit diagram illustrating an example of a configuration of a switching section illustrated in FIG. 4.

FIG. 8 illustrates an example of a configuration of the switching section 300. FIG. 8 also depicts the control circuit 390, the heater 42, and the printer engine control section 59, in addition to the switching section 300. The switching section 300 may include switching circuits 310, 320, 330, and 340, an inductor 301, and a capacitor 302. The switching section 300 may receive the signals Sdc15A and Sdc0A from the DC-DC converter 400A through a terminal T381, the signals Sdc15B and Sdc0B from the DC-DC converter 400B through a terminal T382, and the signals Sdc15C and Sdc0C from the DC-DC converter 400C through a terminal T383. The switching section 300 may also receive the signals Sdc390 and Sdc0B from the power factor correction circuit 100 from a terminal T384.

The switching circuit 310 may perform a switching operation, based on the PWM (Pulse Width Modulation) signal PWMA.

Figure 9:
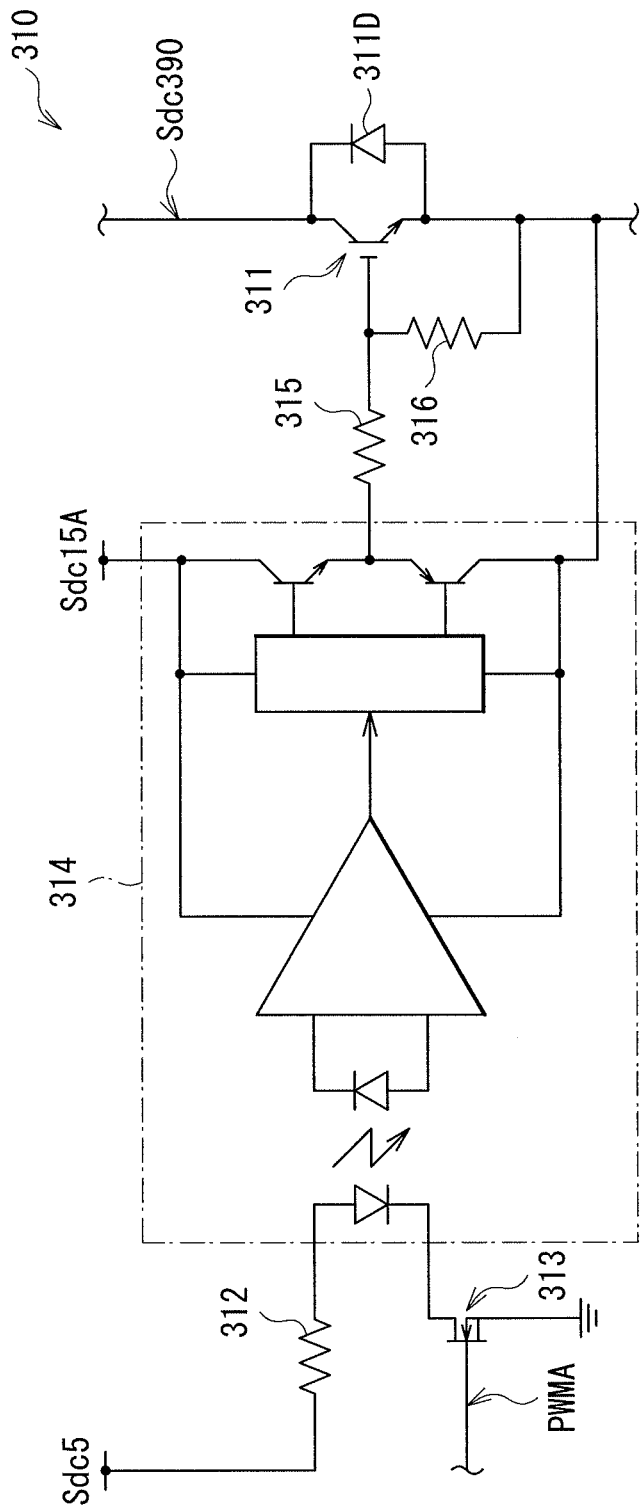
FIG. 9 is a circuit diagram illustrating an example of a configuration of a switching circuit illustrated in FIG. 8.

FIG. 9 illustrates an example of a configuration of the switching circuit 310. The switching circuit 310 may include a resistor 312, an N-channel FET 313, a photo coupler 314, resistors 315 and 316, an IGBT 311, and a diode 311D. It is to be noted that FIG. 8 depicts the IGBT 311 among the elements mentioned above.

The resistor 312 may have a first end that receives the signal Sdc5, and a second end coupled to an anode of a light-emitting diode of the photo coupler 314. The N-channel FET 313 may have a drain coupled to a cathode of the light-emitting diode of the photo coupler 314, a gate that receives the PWM signal PWMA, and a source that may be grounded. The anode of the light-emitting diode of the photo coupler 314 may be coupled to the second end of the resistor 312, and the cathode of the light-emitting diode thereof may be coupled to the drain of the N-channel FET 313. A collector of an NPN transistor of the photo coupler 314 may receive the signal Sdc15A, and an emitter of the NPN transistor thereof may be coupled to a first end of the resistor 315. An emitter of a PNP transistor of the photo coupler 314 may be coupled to the first end of the resistor 315, and a collector of the PNP transistor thereof may be coupled to a second end of the resistor 316, an emitter of the IGBT 311, and an anode of the diode 311D. The resistor 315 may have the first end coupled to the emitter of the NPN transistor and the emitter of the PNP transistor of the photo coupler 314, and a second end coupled to a base of the IGBT 311 and a first end of the resistor 316. The resistor 316 may have the first end coupled to the second end of the resistor 315 and the base of the IGBT 311, and the second end coupled to the collector of the PNP transistor of the photo coupler 314, the emitter of the IGBT 311, and the anode of the diode 311D. The IGBT 311 may have a collector coupled to a cathode of the diode 311D and that receives the signal Sdc390 as illustrated in FIG. 8, the base coupled to the second end of the resistor 315 and the first end of the resistor 316, and the emitter coupled to the anode of the diode 311D, the second end of the resistor 316, and the collector of the PNP transistor of the photo coupler 314. The emitter of the IGBT 311 may also be coupled to the switching circuit 320, a second end of the capacitor 302, and a second end of the heater 42 as illustrated in FIG. 8. The diode 311D may have the anode coupled to the emitter of the IGBT 311, the second end of the resistor 316, and the collector of the PNP transistor of the photo coupler 314, and the cathode coupled to the collector of the IGBT 311 and that receives the signal Sdc390.

The switching circuit 320 as illustrated in FIG. 8 may perform a switching operation, based on the PWM signal PWMB. The switching circuit 320 may have a configuration similar to the configuration of the switching circuit 310 illustrated in FIG. 9. The switching circuit 320 may include a photo coupler that receives the signal Sdc15B, and an IGBT 321. The IGBT 321 may correspond to the IGBT 311 in the switching circuit 310. The IGBT 321 may have a collector coupled to the emitter of the IGBT 311 in the switching circuit 310, the second end of the capacitor 302, and the second end of the heater 42, and an emitter that receives the signal Sdc0B.

The switching circuit 330 may perform a switching operation, based on the PWM signal PWMC. The switching circuit 330 may have a configuration similar to the configuration of the switching circuit 310 illustrated in FIG. 9. The switching circuit 330 may include a photo coupler that receives the signal Sdc15C, and an IGBT 331. The IGBT 331 may correspond to the IGBT 311 in the switching circuit 310. The IGBT 331 may have a collector that receives the signal Sdc390, and an emitter coupled to the switching circuit 340 and a first end of the inductor 301.

The switching circuit 340 may perform a switching operation, based on the PWM signal PWMD. The switching circuit 340 may have a configuration similar to the configuration of the switching circuit 310 illustrated in FIG. 9. The switching circuit 340 may include a photo coupler that receives the signal Sdc15B, and an IGBT 341. The IGBT 341 may correspond to the IGBT 311 in the switching circuit 310. The IGBT 341 may have a collector coupled to the emitter of the IGBT 331 in the switching circuit 330 and the first end of the inductor 301, and an emitter that receives the signal Sdc0B.

In this example embodiment, the IGBTs 311, 321, 331, and 341 are used; however, a switching device is not limited to an IGBT. In an alternative embodiment, a Si-FET, a SiC-FET, a GaN-FET, or any other suitable switching device may be used instead of the IGBT.

The inductor 301 may have the first end coupled to the emitter of the IGBT 331 provided in the switching circuit 330 and the collector of the IGBT 341 provided in the switching circuit 340, and a second end coupled to a first end of the capacitor 302 and a first end of the heater 42. The capacitor 302 may have the first end coupled to the second end of the inductor 301 and the first end of the heater 42, and the second end coupled to the emitter of the IGBT 311 provided in the switching circuit 310, the collector of the IGBT 321 provided in the switching circuit 320, and the second end of the heater 42.

The control circuit 390 may control the switching operation performed in each of the switching circuits 310, 320, 330, and 340. The control circuit 390 may have a configuration that uses, for example but not limited to, an Application Specific Integrated Circuit (ASIC), a Field Programmable Gate Array (FPGA), a microcontroller, or any other suitable control circuit. The control circuit 390 may supply the switching circuits 310, 320, 330, and 340 with their respective PWM signals PWMA, PWMB, PWMC, and PWMD to so control the switching section 300 as to generate the alternating-current signal Sac2. In one specific but non-limiting example, the control circuit 390 may perform switching of each of the IGBTs 331 and 341 at 50 Hz without limitation, and may perform switching of each of the IGBTs 311 and 321 at 20 kHz without limitation. In this example embodiment, a switching frequency of each of the IGBTs 311 and 321 is set to 20 kHz. It is to be noted that the switching frequency is not limited thereto; the switching frequency of each of the IGBTs 311 and 321 may be preferably set at 20 kHz or higher. Such a frequency is higher than a human audible range, making it possible to make a sound (a noise) resulting from the switching of each of the IGBTs 311 and 321 less audible even when the sound is generated. In one embodiment where a frequency well higher than 20 kHz is preferable, a GaN-FET may be used without limitation instead of the IGBT.

Figure 10:
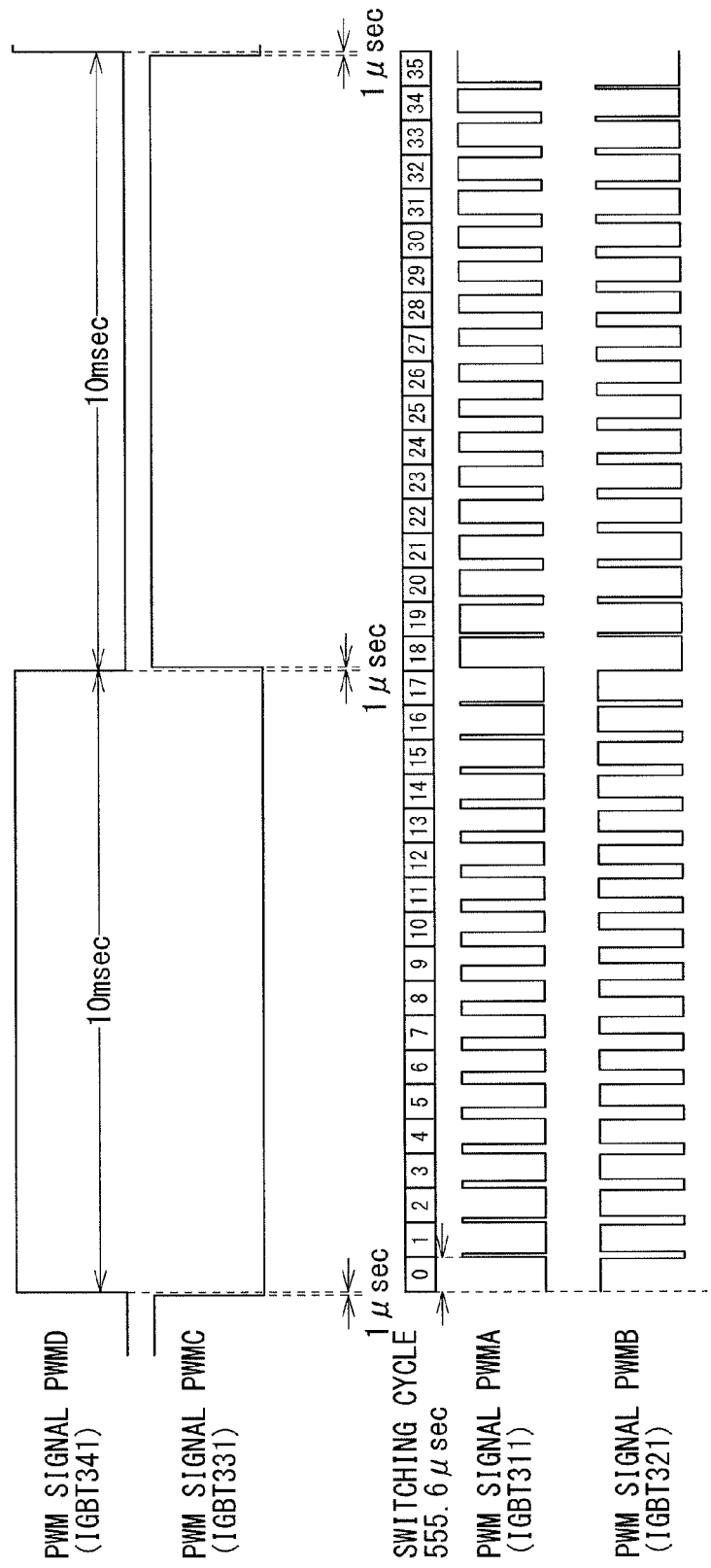
FIG. 10 is a timing waveform chart illustrating an example of an operation of a DC-AC inverter illustrated in FIG. 4.

FIG. 10 illustrates an example of the PWM signals PWMA, PWMB, PWMC, and PWMD. For convenience of description, the switching frequency of each of the IGBTs 311 and 321 is set to 1.8 kHz in one non-limiting example illustrated in FIG. 10. In the illustrated example, the IGBT 311 is turned on when the PWM signal PWMA is at a high level, whereas the IGBT 311 is turned off when the PWM signal PWMA is at a low level. The same applies to the PWM signals PWMB, PWMC, and PWMD.

Referring to FIG. 10, the control circuit 390 may set the PWM signal PWMC to the low level and the PWM signal PWMD to the high level during a first half of one period of each of the PWM signals PWMC and PWMD, thereby causing the IGBT 331 to be turned off and the IGBT 341 to be turned on. Also, the control circuit 390 may set the PWM signal PWMC to the high level and the PWM signal PWMD to the low level during a latter half of the one period of each of the PWM signals PWMC and PWMD, thereby causing the IGBT 331 to be turned on and the IGBT 341 to be turned off. The control circuit 390 may so control the switching section 300 as to prevent both the IGBTs 331 and 341 from being turned on together. In one specific but non-limiting example, the control circuit 390 may cause the IGBT 341 to be turned on after the IGBT 331 is turned off, and may cause the IGBT 331 to be turned on after the IGBT 341 is turned off, as illustrated in FIG. 10. In this example, duration during which both the IGBTs 331 and 341 are turned off (i.e., a dead time) may be set to 1 (one) microsecond without limitation.

The control circuit 390 may also vary a duty ratio of each of the PWM signals PWMA and PWMB gradually as illustrated in FIG. 10. This makes it possible for the DC-AC inverter 62 to generate the alternating-current signal Sac2 in the form of sine wave as described later in greater detail. The dead time of 1 microsecond without limitation may also be provided for the switching section 300 to prevent the IGBTs 311 and 321 from being turned on together.

As illustrated in FIG. 10, the IGBT 341 may be turned on during the first half of one period of each of the PWM signals PWMC and PWMD. Accordingly, causing the IGBT 311 to be turned on in the switching section 300 allows a current to flow in order of the IGBT 311, the heater 42, the inductor 301, and the IGBT 341. Also, the IGBT 331 may be turned on during the latter half of the one period of each of the PWM signals PWMC and PWMD. Accordingly, causing the IGBT 321 to be turned on in the switching section 300 allows a current to flow in order of the IGBT 331, the inductor 301, the heater 42, and the IGBT 321. The DC-AC inverter 62 may generate the alternating-current signal Sac2 in this manner.

Referring to FIG. 8, the control circuit 390 may include a duty ratio table 391 and a counter 392. The duty ratio table 391 may represent a switching duty ratio for each switching cycle of the IGBTs 311 and 321. The counter 392 may count the number of switching cycles.

FIG. 11 illustrates an example of a configuration of the duty ratio table 391. As with the example illustrated in FIG.

10, the switching frequency of each of the IGBTs 311 and 321 is set to 1.8 kHz in one non-limiting example illustrated in FIG. 11 for convenience of description. In the illustrated example, the number of switching cycles is 36 (0 to 35). The switching duty ratios where the switching cycles are 18 to 35 may correspond to the switching duty ratios where the switching cycles are 0 to 17. The duty ratio table 391 may be directed to generation of the alternating-current signal Sac2 in the form of sine wave and whose peak voltage may be 390 Vp.

The number of switching cycles is 400 (0 to 399) when the switching frequency of each of the IGBTs 311 and 321 is set to 20 kHz. Switching duty ratios where the switching cycles are 0 to 199 each may be determined based on the following example expression:

$$\text{DUTY} = \text{Sin}\left(\pi \times \frac{\text{CYCLE}}{199}\right)(0 \leq \text{CYCLE} \leq 199)$$

where DUTY is a switching duty ratio, and CYCLE is a switching cycle.

The control circuit 390 may use the duty ratio table 391 described above to generate the PWM signals PWMA and PWMB. In one specific but non-limiting example, the control circuit 390 may sequentially read out, from the duty ratio table 391, the switching duty ratio that is associated with the switching cycle that corresponds to a value of the counter 392, and may generate the PWM signals PWMA and PWMB, based on the read out switching duty ratios.

The control circuit 390 may generate the PWM signals PWMA and PWMB, based on the power command signal CTL included in the instructions given from the printer engine control section 59. In one specific but non-limiting example, the control circuit 390 may multiply a value of each of the switching duty ratios in the duty ratio table 391 by a predetermined value corresponding to the power command signal CTL to determine the switching duty ratios. For example, upon generating the alternating-current signal Sac2 whose effective value is 100 Vrms (141 Vp), the control circuit 390 may multiply a value of each of the switching duty ratios in the duty ratio table 391 by 0.361 (=141/390). The control circuit 390 may then generate the PWM signals PWMA and PWMB, based on the thus-determined switching duty ratios. It is accordingly possible for the DC-AC inverter 62 to set the effective value of the alternating-current signal Sac2, based on the power command signal CTL.

The counter 392 may be subjected to reset, based on the zero-cross signal SZ. The control circuit 390 may thereby generate the PWM signals PWMA, PWMB, PWMC, and PWMD in response to the zero-cross timing of the alternating-current signal Sac1. It is accordingly possible for the DC-AC inverter 62 to generate the alternating-current signal Sac2 that may be in synchronization with a phase of the alternating-current signal Sac1 as described later in detail.

The control circuit 390 may also have a function of detecting a frequency of the alternating-current signal Sac1, based on the zero-cross signal SZ. The control circuit 390 may perform switching of each of the IGBTs 331 and 341 at a frequency of 50 Hz when the frequency of the alternating-current signal Sac1 is 50 Hz, and may perform switching of each of the IGBTs 331 and 341 at a frequency of 60 Hz when the frequency of the alternating-current signal Sac1 is 60 Hz. Upon switching the IGBTs 331 and 341, the control circuit 390 may vary the switching duty ratio of the IGBTs 311 and 321 in accordance with the frequency of the alternating-current signal Sac1, and perform, based on a varied result of the switching duty ratio thereof, switching of each of the IGBTs 311 and 321.

The control circuit 390 may also have a function of generating the alternating-current signal Sac2 or stopping the generation of the alternating-current signal Sac2, based on the output enable signal ENB included in the instructions given from the printer engine control section 59.

Figure 12:
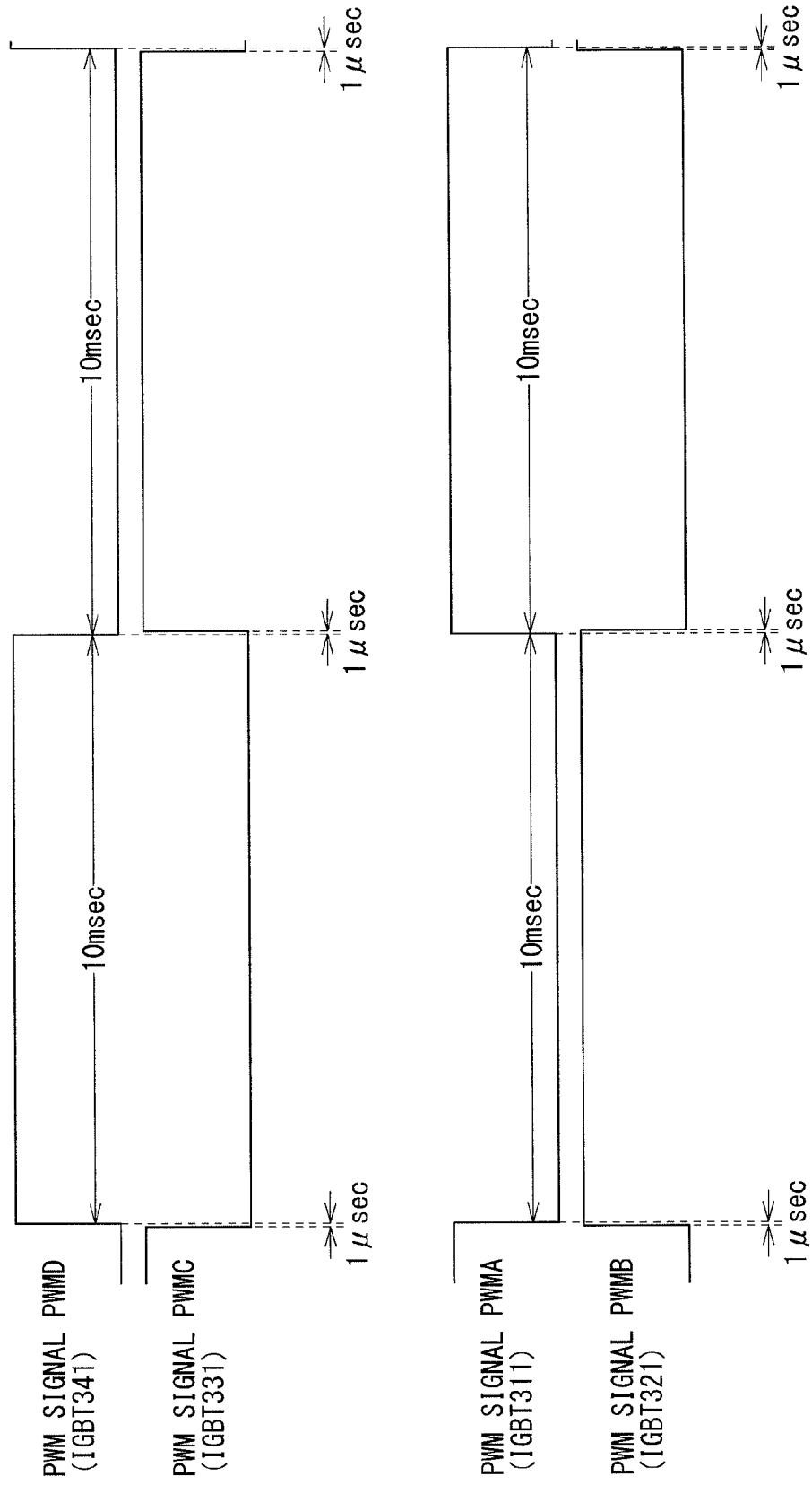
FIG. 12 is a timing waveform chart illustrating another example of an operation of the DC-AC inverter illustrated in FIG. 4.

FIG. 12 illustrates an example of the PWM signals PWMA, PWMB, PWMC, and PWMD upon stopping the generation of the alternating-current signal Sac2. The control circuit 390 may set the PWM signals PWMA and PWMC to a low level and set the PWM signals PWMB and PWMD to a high level during a first half of a period illustrated in FIG. 12, thereby causing the IGBTs 311 and 331 to be turned off and the IGBTs 321 and 341 to be turned on. This prevents the current from flowing to the heater 42. The control circuit 390 may set the PWM signals PWMA and PWMC to a high level and set the PWM signals PWMB and PWMD to a low level during a latter half of the period illustrated in FIG. 12, thereby causing the IGBTs 311 and 331 to be turned on and the IGBTs 321 and 341 to be turned off. This also prevents the current from flowing to the heater 42. In this manner, the control circuit 390 may stop the generation of the alternating-current signal Sac2.

In one embodiment of the invention, the low-voltage power supply section 60 corresponds to a specific but non-limiting example of a "power supply unit". The zero-cross detection circuit 200 corresponds to a specific but non-limiting example of a "synchronization signal generator" in one embodiment of the invention. The bridge diode 204 corresponds to a specific but non-limiting example of a "rectifier" in one embodiment of the invention. The zero-cross signal SZ corresponds to a specific but non-limiting example of a "synchronizing signal" in one embodiment of the invention. The DC-AC inverter 62 corresponds to a specific but non-limiting example of an "alternating-current signal generator" in one embodiment of the invention. The alternating-current signal Sac1 corresponds to a specific but non-limiting example of a "first alternating-current signal" in one embodiment of the invention. The signal Sdc390 corresponds to a specific but non-limiting example of a "direct-current signal" in one embodiment of the invention. The alternating-current signal Sac2 corresponds to a specific but non-limiting example of a "second alternating-current signal" in one embodiment of the invention. The PWM signals PWMA and PWMB may corresponds to a specific but non-limiting example of a "pulse signal" in one embodiment of the invention.

[Operation and Action]

In the following, a description is given of an operation and action of the image forming apparatus 1 according to this example embodiment.

[Outline of Overall Operation]

First, a description is given with reference to FIGS. 1 to 3 of an outline of an overall operation of the image forming apparatus 1. In the image forming apparatus 1, upon receiving the printing data from, for example, an unillustrated host computer through the interface section 51, the printer engine control section 59 may first control the image processing section 52 to generate the bitmap data, based on the printing data. The printer engine control section 59 may further control the low-voltage power supply section 60 to supply the heater 42 in the fixing section 40 with the electric power. The printer engine control section 59 may initiate a printing operation when a temperature of the fixing section 40 detected by the thermistor 44 reaches a temperature suitable for a fixing operation.

In the printing operation, the printer engine control section 59 may first control the hopping motor 11T to rotate the hopping roller 11 and control the resist motor 12T to rotate the resist roller 12. This causes the recording medium 9 to be conveyed along the conveying path 10.

Further, the printer engine control section 59 may control the drum motor 20T to rotate the photosensitive drum 21, the developing roller 24, and the feeding roller 26 in each of the developing sections 20C, 20M, 20Y, and 20K, and may control the belt motor 33T to rotate the drive roller 33. The printer engine control section 59 may control the high-voltage power supply section 55 to generate the various voltages, based on a result of the detection obtained from the medium sensor 13. The printer engine control section 59 may control an operation of the exposure control section 53 to operate each of the exposure heads 16C, 16M, 16Y, and 16K. This causes the electrostatic latent image to be formed on the surface of the photosensitive drum 21 in each of the developing sections 20 first, and then causes the toner images to be formed based on those respective electrostatic latent images. The toner images formed on the respective photosensitive drums 21 of the developing sections 20 may be transferred onto a transfer surface of the recording medium 9.

Further, the printer engine control section 59 may control the heater motor 40T to rotate the heat roller 41 and the pressure-applying roller 43. This causes the toners on the recording medium 9 to be heated, melted, and pressurized in the fixing section 40. As a result, the toner images may be fixed to the recording medium 9.

[Detailed Operation of Low-Voltage Power Supply Section 60]

As illustrated in FIGS. 5 to 7, the alternating-current signal Sac1, which may be supplied from the commercial power supply 99, may be supplied to the power factor correction circuit 100 and the zero-cross detection circuit 200 through the fuse 91 and the common mode choke coil 92.

In the power factor correction circuit 100 as illustrated in FIG. 5, the bridge diode 101 may perform the full-wave rectification on the signal outputted from the common mode choke coil 92. The control circuit 140 may supply the switching circuit 110 and the switching circuit 120 with the gate drive signal GD1 and the gate drive signal GD2, respectively, to thereby control the switching operation performed in each of the switching circuits 110 and 120. The switching circuits 110 and 120 each may perform the switching operation on a signal rectified by the bridge diode 101.

Also, the diodes 131 and 132 each may perform the full-wave rectification on the signal outputted from the common mode choke coil 92. The signal having been subjected to the full-wave rectification may then be subjected to voltage division by the resistors 136 and 137 to be supplied as the signal ACIN to the control circuit 140. The control circuit 140 may so control, based on the signal ACIN, the switching operation performed in each of the switching circuits 110 and 120 as to allow the power factor to be close to one.

This results in generation of a boosted signal at each of the second end of the inductor 111 in the switching circuit 110 and the second end of the inductor 121 in the switching circuit 120. The diodes 102 and 103 and the electrolytic capacitor 104 may perform smoothing of each of those signals to generate the signal Sdc390. The signal Sdc390 may be subjected to voltage division by the resistors 107 and 108 to be supplied as the signal FB to the control circuit 140. The control circuit 140 may vary, based on the signal FB, the switching duty ratio of each of the gate drive signals GD1 and GD2 to so control the voltage of the signal Sdc390 as to be a desired voltage (which can be 390 V although it is not limited thereto). In this manner, the power factor correction circuit 100 may generate the signal Sdc390.

In the zero-cross detection circuit 200 as illustrated in FIG. 7, the bridge diode 204 may perform the full-wave rectification on the signal between the second end of the resistor 202 and the second end of the capacitor 203. The signal having been rectified by the bridge diode 204 may be amplified to be supplied to the D flip-flop 213. The D flip-flop 213 may output the zero-cross signal that may be inverted at every rising edge of a signal at the clock input terminal thereof. In this manner, the zero-cross detection circuit 200 may generate the zero-cross signal SZ that may be inverted for each zero-cross timing of the alternating-current signal Sac1.

In the DC-AC inverter 62 as illustrated in FIG. 8, the control circuit 390 may supply the switching circuits 310, 320, 330, and 340 with their respective PWM signals PWMA, PWMB, PWMC, and PWMD to control the switching operation in the switching section 300. Upon controlling the switching operation, the control circuit 390 may read out, from the duty ratio table 391, the switching duty ratio that is associated with the switching cycle that corresponds to a value of the counter 392, and may generate the PWM signals PWMA, PWMB, PWMC, and PWMD, based on the read out switching duty ratios. The switching section 300 may perform the switching operation on the signal Sdc390. The inductor 301 and the capacitor 302 may serve as an LC filter, and thus remove, from the received signal, a high-frequency component resulting from the switching operation to generate the alternating-current signal Sac2.

[Phase of Alternating-Current Signal Sac2]

The counter 392 in the control circuit 390 of the DC-AC inverter 62 may be subjected to reset, based on the zero-cross signal SZ. Thereby, the control circuit 390 may generate the PWM signals PWMA, PWMB, PWMC, and PWMD in response to the zero-cross timing of the alternating-current signal Sac1. As a result, the DC-AC inverter 62 may generate the alternating-current signal Sac2 that may be in synchronization with the alternating-current signal Sac1 as described below.

Figure 13:
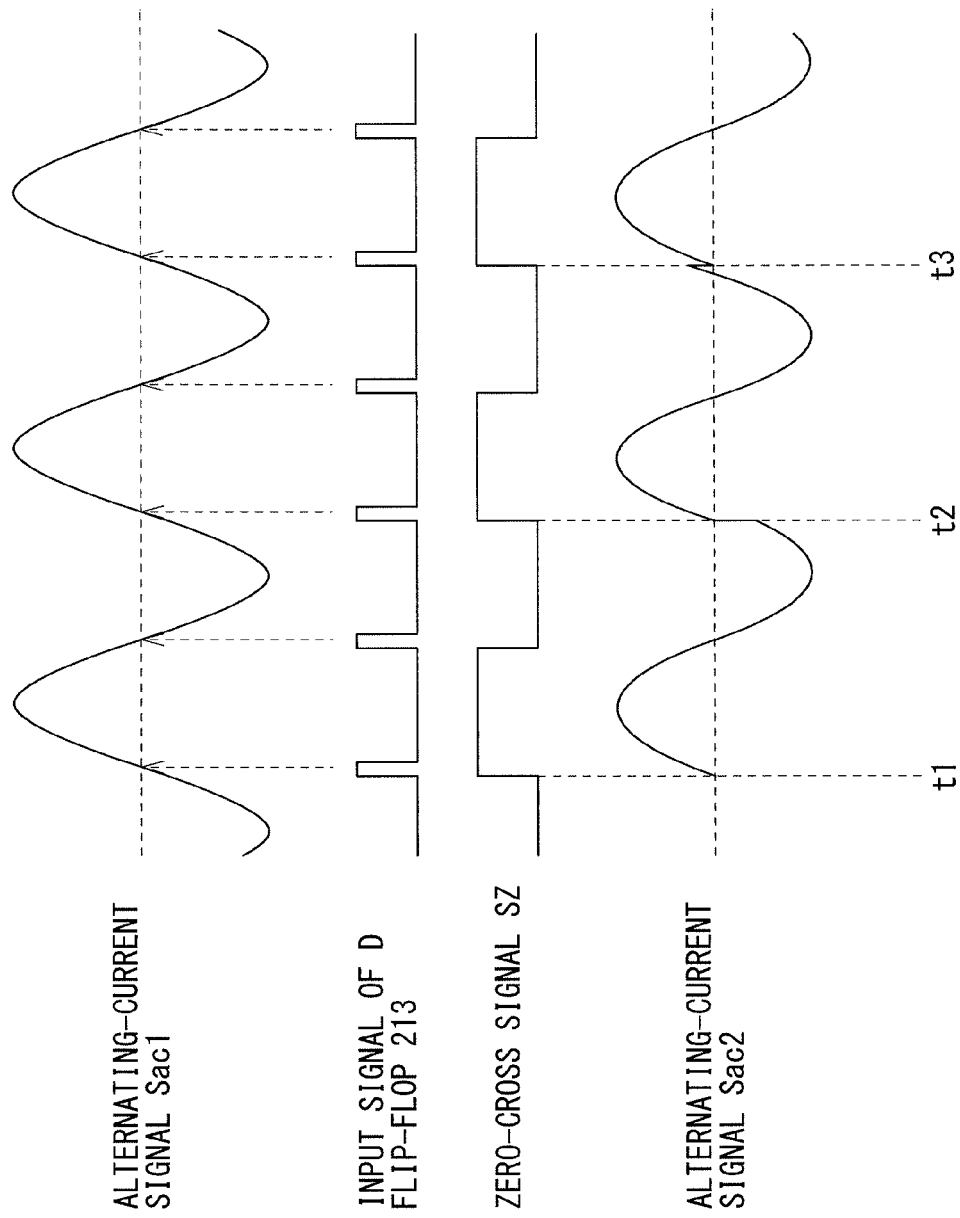
FIG. 13 is a timing waveform chart illustrating an example of an operation of the low-voltage power supply section illustrated in FIG. 4.

FIG. 13 illustrates an example of an operation of the low-voltage power supply section 60. It is to be noted that FIG. 13 depicts waveforms in an exaggerated fashion for convenience of description. In the zero-cross detection circuit 200, a pulse may be supplied to the clock input terminal of the D flip-flop 213 in response to the zero-cross timing of the alternating-current signal Sac1. The D flip-flop 213 may invert the zero-cross signal SZ, based on the pulse. In other words, the zero-cross signal SZ may be in synchronization with the alternating-current signal Sac1. In an illustrated example, a phase of the zero-cross signal SZ may be substantially in agreement with the phase of the alternating-current signal Sac1. Also, in the illustrated example, the counter 392 of the DC-AC inverter 62 may be subjected to reset at the timing of rising of the zero-cross signal SZ (for example, at each of the timings t1 to t3). Hence, the DC-AC inverter 62 may start to output, as the alternating-current signal Sac2, a signal in the form of sine wave from the timing of rising of the zero-cross signal SZ. In the illustrated example, the zero-cross signal SZ rises at the timing t2 prior to completion of one period of the alternating-current signal Sac2 starting from the timing t1. Even in this case, one period of the alternating-current signal Sac2 starts from the timing t2. In addition, the zero-cross signal SZ rises at the timing t3, after the one period of the alternating-current signal Sac2 starting from the timing t2 is completed and the subsequent second period is started. Even in this case, one period of the alternating-current signal Sac2 starts from the timing t3. In other words, a phase of the alternating-current signal Sac2 is brought substantially into agreement with the phase of the alternating-current signal Sac1. In this manner, the DC-AC inverter 62 may generate the alternating-current signal Sac2 that may be in synchronization with the alternating-current signal Sac1.

Figure 14:
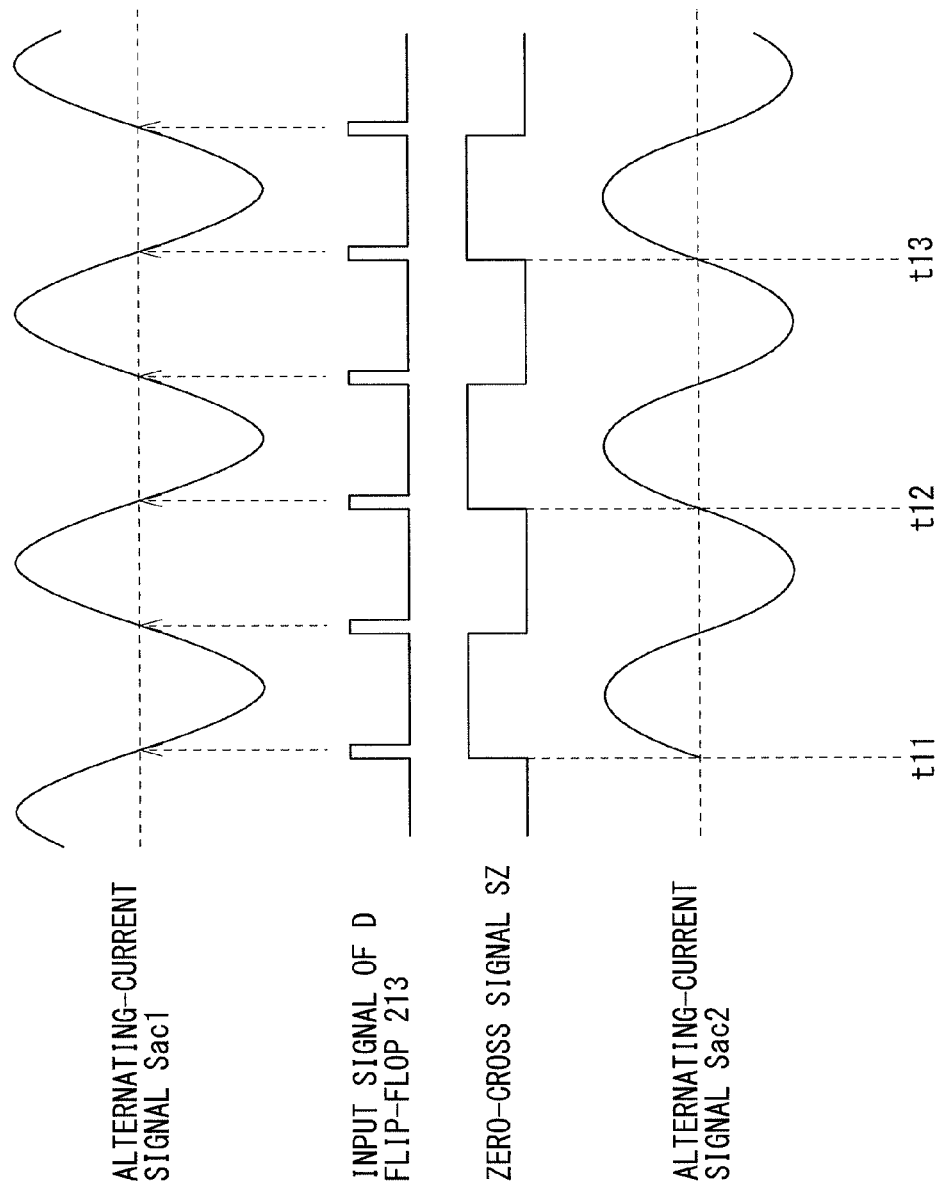
FIG. 14 is a timing waveform chart illustrating another example of an operation of the low-voltage power supply section illustrated in FIG. 4.

FIG. 14 illustrates another example of an operation of the low-voltage power supply section 60. In an illustrated example, a phase of the zero-cross signal SZ and the phase of the alternating-current signal Sac1 may be staggered with respect to each other by about 180 degrees. The counter 392 of the DC-AC inverter 62 may be subjected to reset at the timing of rising of the zero-cross signal SZ (for example, at each of the timings t11 to t13). Hence, the DC-AC inverter 62 may start to output, as the alternating-current signal Sac2, a signal in the form of sine wave from the timing of rising of the zero-cross signal SZ. In other words, the phase of the alternating-current signal Sac1 and a phase of the alternating-current signal Sac2 are staggered with respect to each other by about 180 degrees. In this manner, the DC-AC inverter 62 may generate the alternating-current signal Sac2 that may be in synchronization with the alternating-current signal Sac1.

As described above with reference to non-limiting examples, the DC-AC inverter 62 may generate the alternating-current signal Sac2 that may be in synchronization with the alternating-current signal Sac1, based on the zero-cross signal SZ. In particular, in one embodiment, the phase of the alternating-current signal Sac2 may be made substantially equal to the phase of the alternating-current signal Sac1, or may be staggered with respect to the phase of the alternating-current signal Sac1 by about 180 degrees. In other words, a phase corresponding to a peak of the alternating-current signal Sac2 and a phase corresponding to a peak of the alternating-current signal Sac1 may be substantially brought into agreement with each other. This makes it possible to suppress a ripple in the signal Sdc390 and to suppress a generation of a sound as described below.

If the alternating-current signal Sac1 and the alternating-current signal Sac2 are not in synchronization with each other, a phase relationship between the alternating-current signal Sac1 and the alternating-current signal Sac2 change with time. In such a situation, if the phase of the alternating-current signal Sac1 and the phase of the alternating-current signal Sac2 are staggered with respect to each other by about 90 degrees, a phase of an input current of the power factor correction circuit 100 and a phase of an output current of the DC-AC inverter 62 are staggered with respect to each other by about 90 degrees. Under such circumstances, for example, if the output current of the DC-AC inverter 62 is increased upon the low input current of the power factor correction circuit 100, an electric discharge occurs in the electrolytic capacitor 104 of the power factor correction circuit 100, which in turn causes a voltage drop. If the voltage of the alternating-current signal Sac1 increases following the timing of the occurrence of the voltage drop, the control circuit 140 attempts to supply the electrolytic capacitor 104 with more current to compensate for the voltage drop. This results in the large ripple in the signal Sdc390. The use of a high-capacity electrolytic capacitor may allow for suppression of the ripple, but this also results in an increase in mounting area. Also, because the alternating-current signal Sac1 and the alternating-current signal Sac2 are not in synchronization with each other, a phase difference varies at a period that corresponds to a difference in frequency between the alternating-current signal Sac1 and the alternating-current signal Sac2, causing a variation in the ripple. In particular, the heater 42 serves as a large load typically in a range of, for example but not limited to, about 800 W to about 1200 W, and such a variation in ripple makes a fluctuation of the current that flows to the inductors 111 and 121 large, which may in turn lead to a generation of a sound.

In contrast, the low-voltage power supply section 60 may synchronize the alternating-current signal Sac1 with the alternating-current signal Sac2, based on the zero-cross signal SZ. In particular, in one embodiment, the low-voltage power supply section 60 may bring the phase of the alternating-current signal Sac2 into agreement with the phase of the alternating-current signal Sac1, or may stagger the phase of the alternating-current signal Sac2 and the phase of the alternating-current signal Sac1 with respect to each other by about 180 degrees. Thus, the low-voltage power supply section 60 makes it possible to suppress a variation in phase difference between an input and an output to a predetermined amount or less. Hence, it is possible to suppress the ripple in the signal Sdc390 and the generation of the sound, while allowing for the use of the electrolytic capacitor 104 having a practical capacitance value.

[Effective Value of Alternating-Current Signal Sac2]

The printer engine control section 59 may supply the low-voltage power supply section 60 with the power command signal CTL to give the instructions on the amount of electric power to be supplied to the heater 42. Further, the control circuit 390 of the DC-AC inverter 62 may vary the switching duty ratio, based on the power command signal CTL. In the following, a description is given in detail of such an operation.

The printer engine control section 59 may supply the low-voltage power supply section 60 with the power command signal CTL to give the instructions on the amount of electric power to be supplied to the heater 42. In one specific but non-limiting example, the printer engine control section 59 may instruct, using the power command signal CTL, the low-voltage power supply section 60 to gradually increase the amount of electric power to be supplied to the heater 42 upon, for example, starting the supply of electric power to the heater 42. This may be performed from a viewpoint of the large inrush current resulting from the low resistance value of the heater 42 upon the initiation of electric conduction of the non-warmed up heater 42. To address the occurrence of large inrush current, the printer engine control section 59 may set the amount of electric power to be supplied to the heater 42 to be low in the initial stage, following which the printer engine control section 59 may increase the amount of electric power when there is the decrease in current resulting from warm up of the heater 42. In this manner, the printer engine control section 59 may instruct, using the power command signal CTL, the low-voltage power supply section 60 to gradually increase the amount of electric power to be supplied to the heater 42 upon starting the supply of electric power to the heater 42, for example.

Figure 15:
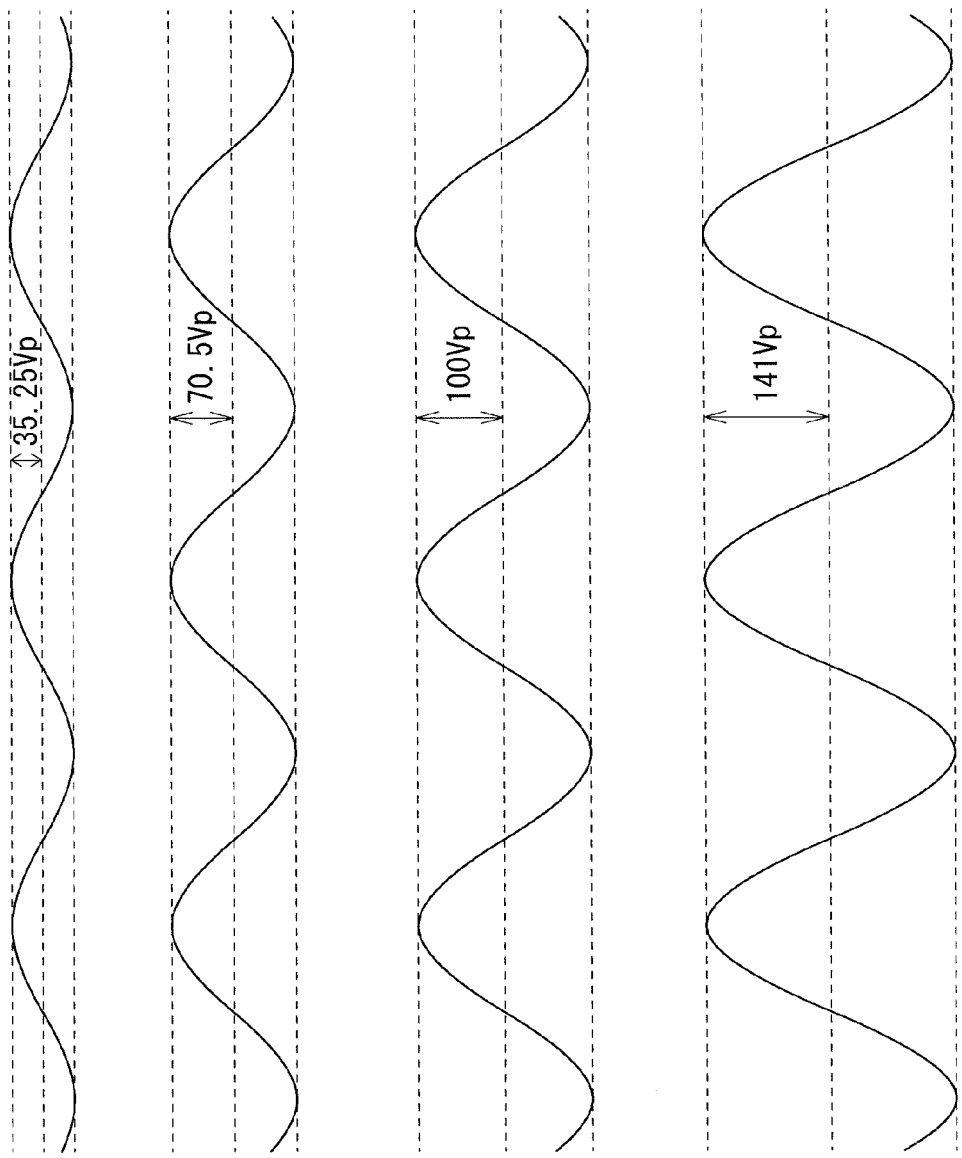
FIGS. 15A to 15D are each a waveform chart illustrating an example of an alternating-current signal outputted from the DC-AC inverter illustrated in FIG. 4.

FIGS. 15A to 15D each illustrate an example of a waveform of the alternating-current signal Sac2. FIG. 15A illustrates a waveform of the alternating-current signal Sac2 whose effective value is 25 Vrms (35.25 Vp), and FIG. 15B illustrates a waveform of the alternating-current signal Sac2 whose effective value is 50 Vrms (70.5 Vp). FIG. 15C illustrates a waveform of the alternating-current signal Sac2 whose effective value is 71 Vrms (100 Vp), and FIG. 15D illustrates a waveform of the alternating-current signal Sac2 whose effective value is 100 Vrms (141 Vp). In these illustrated examples, the DC-AC inverter 62 may vary amplitude of the alternating-current signal Sac2 to vary the effective value of the alternating-current signal Sac2.

Figure 17:
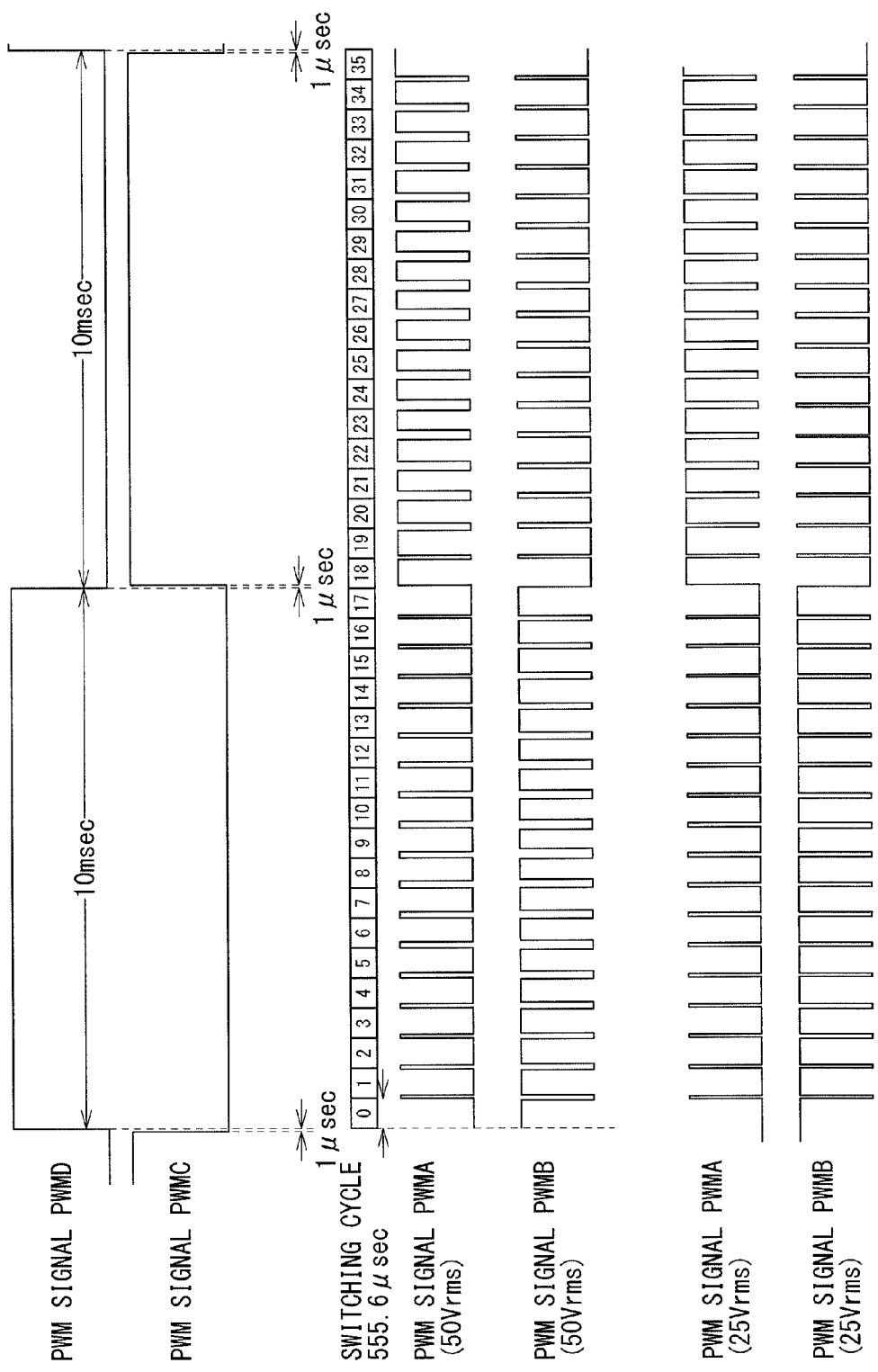
FIG. 17 is a timing waveform chart illustrating an example of an operation of the DC-AC inverter illustrated in FIG. 4.

FIG. 16 illustrates an example of switching duty ratios directed to generation of the alternating-current signals Sac2 with various amplitudes as illustrated in FIGS. 15A to 15D. FIG. 17 illustrates an example of the PWM signals PWMA, PWMB, PWMC, and PWMD. The control circuit 390 may multiply a value of each of the switching duty ratios in the duty ratio table 391 by a predetermined value that corresponds to the power command signal CTL to determine the switching duty ratios. Further, the control circuit 390 may generate the PWM signals PWMA and PWMB, based on the determined switching duty ratios. Hence, it is possible for the DC-AC inverter 62 to generate any alternating-current signal Sac2 having the effective value that corresponds to the power command signal CTL as illustrated in FIGS. 15A to 15D.

As described in the foregoing example embodiment, the low-voltage power supply section 60 performs the switching operation on the signal Sdc390 generated by the power factor correction circuit 100 and thereby generates the alternating-current signal Sac2. This makes the power factor to be close to 1 regardless of a state of supply of electric power to be supplied to the heater 42, and thus averages a consumption current. As a result, it is possible to reduce a possibility of an occurrence of a conduction noise, a flicker, or both. Also, in one embodiment where a plurality of heaters are provided and triacs are used to control electric power to be supplied to those heaters, the triacs may be brought into electric conduction in synchronization with the zero-cross timing. Even in this case, it is possible to suppress a rapid fluctuation in a load.

Also, the low-voltage power supply section 60 performs the switching operation on the signal Sdc390 to generate the alternating-current signal Sac2. This makes it possible to eliminate a necessity to provide a fixing unit for each of supply voltages of the commercial power supplies. If a configuration is employed in which the alternating-current signal Sac1 supplied from the commercial power supply 99 is directly supplied to the heater while performing a phase control, it is necessary to prepare the fixing section for each of the supply voltages of the commercial power supplies. In contrast, the low-voltage power supply section 60 performs the switching operation on the signal Sdc390 to generate the alternating-current signal Sac2. Hence, it is possible to allow for sharing of the fixing section irrespective of the supply voltage of the commercial power supply 99.

[Example Effect]

According to the foregoing example embodiment, the switching operation is performed on the signal Sdc390 generated by the power factor correction circuit to generate the alternating-current signal Sac2. Hence, it is possible to reduce a possibility of an occurrence of a conduction noise, a flicker, or both.

Also, according to the foregoing example embodiment, the alternating-current signal Sac1 and the alternating-current signal Sac2 may be synchronized with each other based on the zero-cross signal. In particular, in one embodiment, the phase of the alternating-current signal Sac2 may be made substantially equal to the phase of the alternating-current signal Sac1, or may be staggered with respect to the phase of the alternating-current signal Sac1 by about 180 degrees. Hence, it possible to suppress the ripple in the signal Sdc390 and to suppress a generation of a sound.

Further, according to the foregoing example embodiment, the switching duty ratio may be varied based on the power command signal CTL. Hence, it is possible to control a temperature of the heater, and to suppress the inrush current upon, for example, starting the supply of electric power to the heater.

In addition, according to the foregoing example embodiment, the switching operation is performed on the signal Sdc390 to generate the alternating-current signal Sac2. Hence, it is possible to eliminate the necessity to provide a fixing unit for each of supply voltages of the commercial power supplies, and thereby to allow for sharing of the fixing section.

[Modification Example]

In the foregoing example embodiment, the DC-AC inverter 62 may vary the amplitude of the alternating-current signal Sac2 to vary the effective value of the alternating-current signal Sac2. However, this is illustrative and non-limiting. In the following, a description is given in detail of a modification example.

Figure 18A:
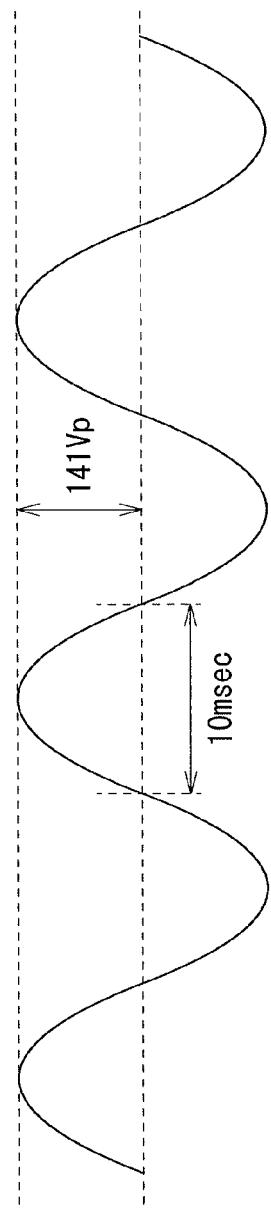
FIGS. 18A to 18C are each a waveform chart illustrating an example of an alternating-current signal outputted from the DC-AC inverter according to a modification example.
Figure 18B:
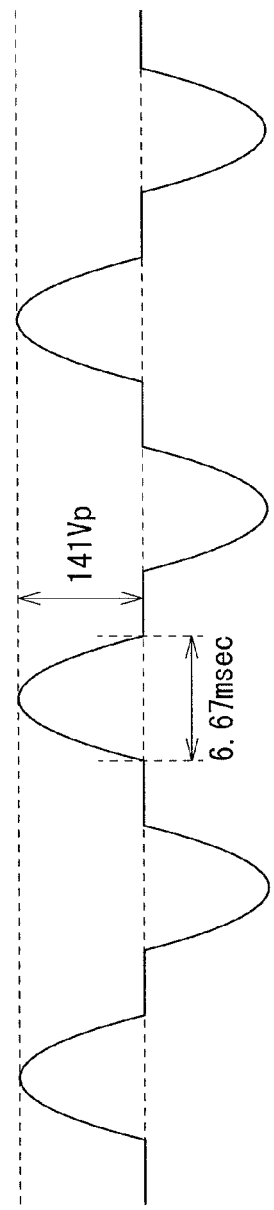
Figure 18C:
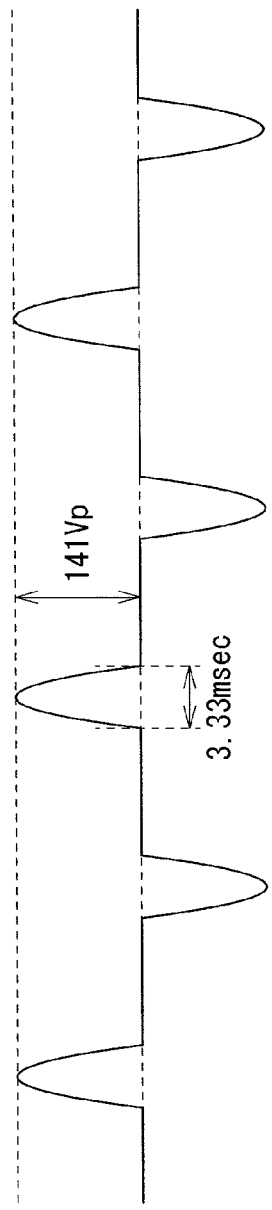

FIGS. 18A to 18C each illustrate an example of a waveform of the alternating-current signal Sac2. FIG. 18A illustrates a waveform of the alternating-current signal Sac2 whose effective value is 100 Vrms, FIG. 18B illustrates a waveform of the alternating-current signal Sac2 whose effective value is 70 Vrms, and FIG. 18C illustrates a waveform of the alternating-current signal Sac2 whose effective value is 30 Vrms. In the modification example, a time length of a portion of an alternating-current waveform in the alternating-current signal Sac2 is varied to vary the effective value of the alternating-current signal Sac2.

Figure 20:
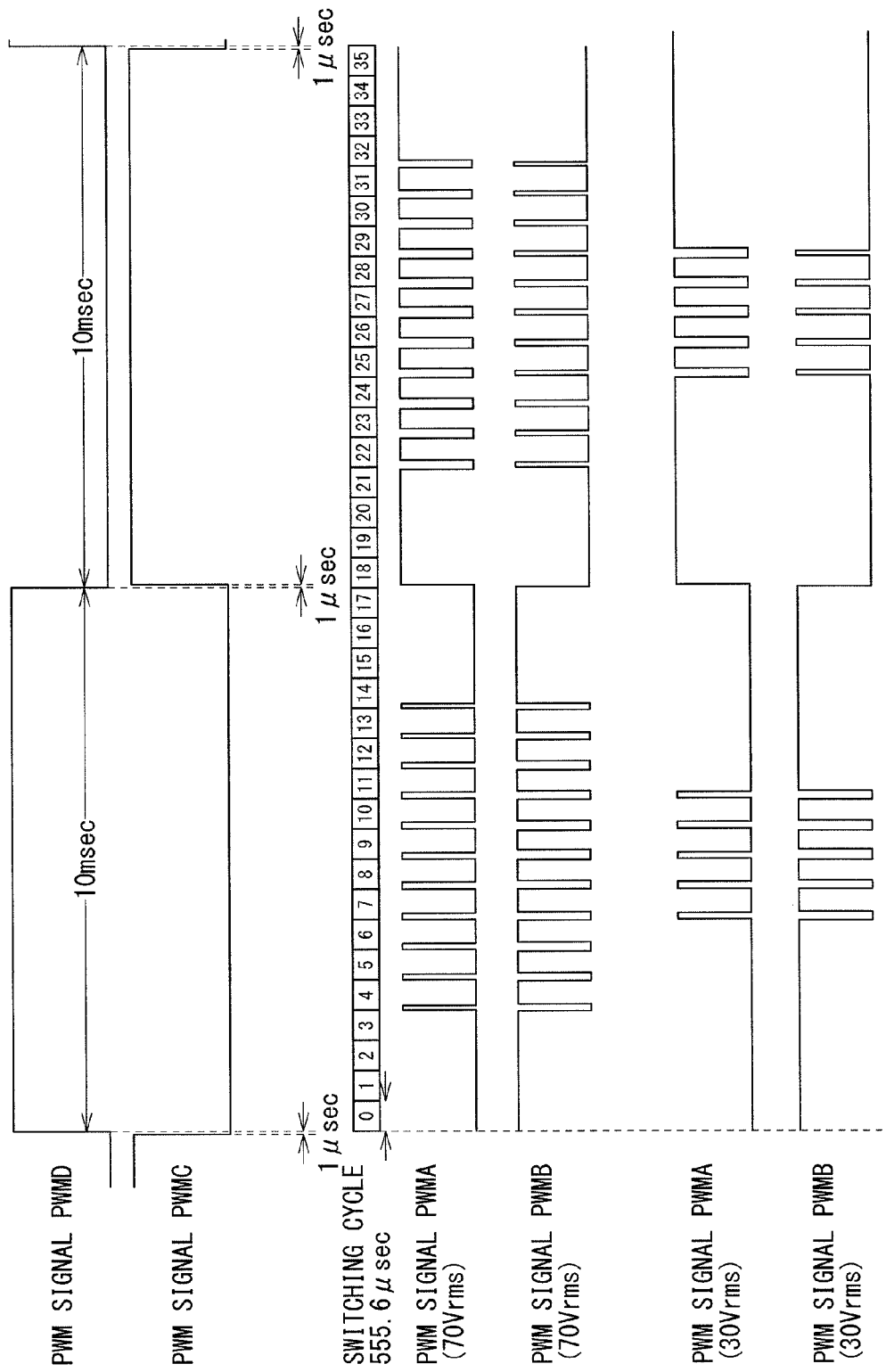
FIG. 20 is a timing waveform chart illustrating an example of an operation of the DC-AC inverter according to the modification example.

FIG. 19 illustrates an example of switching duty ratios directed to generation of the various alternating-current signals Sac2 as illustrated in FIGS. 18A to 18C. FIG. 20 illustrates an example of the PWM signals PWMA, PWMB, PWMC, and PWMD. For convenience of description, the switching frequency of each of the IGBTs 311 and 321 is set to 1.8 kHz in the illustrated example.

Even with the configuration according to the modification example, it is possible to control a temperature of the heater 42 and to suppress the inrush current upon, for example, starting the supply of electric power to the heater 42, as with the example embodiment described above. In the modification example, the amplitude of the alternating-current signal Sac2 may be varied as with the foregoing example embodiment upon, for example, starting the supply of electric power to the heater 42.

Also, in the modification example, the PWM signals PWMA and PWMB are varied to directly vary a time length of a portion of the alternating-current waveform as illustrated in FIGS. 18A to 20. However, this is illustrative and non-limiting; in an alternative example, a configuration may be employed in which a time length of a portion of the alternating-current waveform may be made constant and a period of each of the PWM signals PWMC and PWMD may be varied. Even with this configuration, a time length of a portion of the alternating-current waveform is varied relatively in one period of each of the PWM signals PWMC and PWMD, making it possible to vary the effective value of the alternating-current signal Sac2.

Although the invention has been described in the foregoing by way of example with reference to the example embodiments and the modification examples, the invention is not limited thereto but may be modified in a wide variety of ways.

For example, in the example embodiments and the modification examples, the frequency of the alternating-current signal Sac2 is made substantially equal to the frequency of the alternating-current signal Sac1. However, this is illustrative and non-limiting; in one embodiment, the frequency of the alternating-current signal Sac2 may be set to integral multiple of the frequency of the alternating-current signal Sac1. In a specific but non-limiting embodiment, the frequency of the alternating-current signal Sac2 may be made about twice the frequency of the alternating-current signal Sac1. Even in these examples, it is possible to bring the zero-cross timing of the alternating-current signal Sac1 and the zero-cross timing of the alternating-current signal Sac2 into agreement with each other substantially.

Also, although the example embodiments and the modification examples have been described with reference to some examples of specific circuit configurations, such circuit configurations are illustrative and non-limiting. For example, a configuration of the zero-cross detection circuit 200 is not limited to the configuration illustrated in FIG. 5. In one embodiment, for the zero-cross detection circuit 200, a Phase Locked Loop (PLL) may be used to synchronize the zero-cross signal SZ with the alternating-current signal Sac1 more accurately. For example, a configuration of the power factor correction circuit 100 is not limited to the configuration illustrated in each of FIGS. 5 and 6. Further, a configuration of the switching section 300 is not limited to the configuration illustrated in each of FIGS. 7 and 8.

Also, although the example embodiments and the modification examples have been described with reference to a color printer, an application of an embodiment of the invention is not limited to the color printer. Any embodiment of the invention may be applied to a monochrome printer without limitation.

Further, although the example embodiments and the modification examples have been described with reference to a printer, an application of an embodiment of the invention is not limited to the printer. Any embodiment of the invention is applicable to a printer, a facsimile, a scanner, a Multi-Function Peripheral in which two or more of the printer, the facsimile, and the scanner are combined, or any other instrument that forms an image on a medium.

Furthermore, the invention encompasses any possible combination of some or all of the various embodiments and the modification examples described herein and incorporated herein.

It is possible to achieve at least the following configurations from the above-described example embodiments of the invention.

(1) A power supply unit, including:
a power factor correction circuit configured to generate, based on a first alternating-current signal, a direct-current signal;
a synchronizing signal generator configured to generate, based on the first alternating-current signal, a synchronizing signal that is in synchronization with the first alternating-current signal; and
an alternating-current signal generator including a switching section, and configured to generate, based on the direct-current signal, a second alternating-current signal, the switching section being configured to perform, based on the synchronizing signal, a switching operation, and the second alternating-current signal having a variable effective voltage value.

(2) The power supply unit according to (1), wherein the switching section performs the switching operation to cause a frequency of the second alternating-current signal to be substantially integral multiple of a frequency of the first alternating-current signal.

(3) The power supply unit according to (2), wherein the frequency of the second alternating-current signal is substantially equal to the frequency of the first alternating-current signal.

(4) The power supply unit according to (3), wherein a phase difference between the first alternating-current signal and the second alternating-current signal is one of about zero degree and about 180 degrees.

(5) The power supply unit according to any one of (1) to (4), wherein the alternating-current signal generator varies the effective voltage value by varying amplitude of the second alternating-current signal.

(6) The power supply unit according to any one of (1) to (4), wherein the alternating-current signal generator varies the effective voltage value by varying a time length of a portion of an alternating-current waveform in the second alternating-current signal.

(7) The power supply unit according to any one of (1) to (6), wherein the switching section performs the switching operation, based on a pulse signal, the pulse signal having a plurality of pulses and starting from a timing that corresponds to the synchronizing signal.

(8) The power supply unit according to (7), wherein the alternating-current signal generator varies the effective voltage value by varying a duty ratio of each of the pulses.

(9) The power supply unit according to (8), wherein the switching section includes a duty ratio table, and sets, based on the duty ratio table, the duty ratio of each of the pulses, the duty ratio table having values that correspond to the duty ratios of the respective pulses.

(10) The power supply unit according to (9), wherein the switching section includes a counter that is subjected to reset based on the synchronizing signal, the switching section generating the pulse signal by sequentially reading out, based on a value of the counter, the values that correspond to the duty ratios of the respective pulses from the duty ratio table.

(11) The power supply unit according to any one of (1) to (10), wherein the synchronizing signal generator generates the synchronizing signal by detecting a zero-cross timing of the first alternating-current signal.

(12) The power supply unit according to any one of (1) to (11), wherein the synchronizing signal generator includes a rectifier configured to rectify the first alternating-current signal, and generates the synchronizing signal, based on an output signal derived from the rectifier.

(13) The power supply unit according to any one of (1) to (12), wherein the alternating-current signal generator supplies the second alternating-current signal to a heater.

(14) An image forming apparatus, including:
a developing unit;
a fixing unit including a heater, and configured to fix a developer to a recording medium; and
the power supply unit according to any of (1) to (13), and configured to supply the heater with electric power.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A power supply unit, comprising:
a power factor correction circuit configured to convert a first alternating-current signal into a direct-current signal;
a synchronizing signal generator configured to generate, based on the first alternating-current signal, a synchronizing signal that is in synchronization with the first alternating-current signal; and
an alternating-current signal generator including a switching section and a control circuit, and configured to convert, with the switching section, the direct-current signal into a second alternating-current signal, and supply the second alternating-current signal to a load, the switching section being configured to perform, based on the synchronizing signal, a switching operation, the control circuit being configured to vary an effective voltage value of the second alternating-current signal by controlling an operation of the switching section, the effective voltage value of the second alternating-current signal being greater than zero volts.

2. The power supply unit according to claim 1, wherein the switching section performs the switching operation to cause a frequency of the second alternating-current signal to be substantially integral multiple of a frequency of the first alternating-current signal.

3. The power supply unit according to claim 2, wherein the frequency of the second alternating-current signal is substantially equal to the frequency of the first alternating-current signal.

4. The power supply unit according to claim 3, wherein a phase difference between the first alternating-current signal and the second alternating-current signal is one of about zero degree and about 180 degrees.

5. The power supply unit according to claim 1, wherein the alternating-current signal generator varies the effective voltage value by varying amplitude of the second alternating-current signal.

6. The power supply unit according to claim 1, wherein the alternating-current signal generator varies the effective voltage value by varying a time length of a portion of an alternating-current waveform in the second alternating-current signal.

7. The power supply unit according to claim 1, wherein the switching section performs the switching operation, based on a pulse signal, the pulse signal having a plurality of pulses and starting from a timing that corresponds to the synchronizing signal.

8. The power supply unit according to claim 7, wherein the alternating-current signal generator varies the effective voltage value by varying a duty ratio of each of the pulses.

9. The power supply unit according to claim 8, wherein the control circuit includes a duty ratio table, and sets, based on the duty ratio table, the duty ratio of each of the pulses, the duty ratio table having values that correspond to the duty ratios of the respective pulses.

10. The power supply unit according to claim 9, wherein the control circuit includes a counter that is subjected to reset based on the synchronizing signal, the switching section generating the pulse signal by sequentially reading out, based on a value of the counter, the values that correspond to the duty ratios of the respective pulses from the duty ratio table.

11. The power supply unit according to claim 1, wherein the synchronizing signal generator generates the synchronizing signal by detecting a zero-cross timing of the first alternating-current signal.

12. The power supply unit according to claim 1, wherein the synchronizing signal generator includes a rectifier configured to rectify the first alternating-current signal, and generates the synchronizing signal, based on an output signal derived from the rectifier.

13. The power supply unit according to claim 1, wherein the alternating-current signal generator supplies the second alternating-current signal to a heater.

14. The power supply unit according to claim 1, wherein the control section varies the effective voltage value of the second alternating-current signal from a first effective voltage value that is greater than the zero volt to a second effective voltage value that is greater than the zero volt.

15. The power supply unit according to claim 14, wherein the second effective voltage value is greater than the first effective voltage value.

16. The power supply unit according to claim 1, wherein the control section controls the operation of the switching section to cause a zero-cross timing of the first alternating-current signal and a period in which the second alternating-current signal is about the zero volt to be brought into agreement with each other.

17. The power supply unit according to claim 16, wherein the synchronizing signal generator generates the synchronizing signal by detecting the zero-cross timing of the first alternating-current signal.

18. An image forming apparatus, comprising:
a developing unit;
a fixing unit including a heater, and configured to fix a developer to a recording medium; and
a power supply unit configured to supply the heater with electric power, the power supply unit including:
a power factor correction circuit configured to convert a first alternating-current signal into a direct-current signal;
a synchronizing signal generator configured to generate, based on the first alternating-current signal, a synchronizing signal that is in synchronization with the first alternating-current signal; and
an alternating-current signal generator including a switching section and a control circuit, and configured to convert, with the switching section, the direct-current signal into a second alternating-current signal, and supply the second alternating-current signal to a load, the switching section being configured to perform, based on the synchronizing signal, a switching operation, the control circuit being configured to vary an effective voltage value of the second alternating-current signal by controlling an operation of the switching section, the effective voltage value of the second alternating-current signal being greater than zero volts.

* * * * *